United States Patent
Hoang et al.

(10) Patent No.: US 12,518,129 B2
(45) Date of Patent: Jan. 6, 2026

(54) METHOD AND SYSTEM FOR OVER-PREDICTION IN NEURAL NETWORKS

(71) Applicant: Oracle International Corporation, Redwood Shores, CA (US)

(72) Inventors: Cong Duy Vu Hoang, Wantirna South (AU); Thanh Tien Vu, Herston (AU); Poorya Zaremoodi, Melbourne (AU); Ying Xu, Albion (AU); Vladislav Blinov, Melbourne (AU); Yu-Heng Hong, Carlton (AU); Yakupitiyage Don Thanuja Samodhye Dharmasiri, Melbourne (AU); Vishal Vishnoi, Redwood City, CA (US); Elias Luqman Jalaluddin, Seattle, WA (US); Manish Parekh, San Jose, CA (US); Thanh Long Duong, Seabrook (AU); Mark Edward Johnson, Castle Cove (AU)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 934 days.

(21) Appl. No.: 17/455,181

(22) Filed: Nov. 16, 2021

(65) Prior Publication Data
US 2022/0172021 A1    Jun. 2, 2022

Related U.S. Application Data

(60) Provisional application No. 63/119,566, filed on Nov. 30, 2020.

(51) Int. Cl.
*G06N 3/04*    (2023.01)
*G06N 3/08*    (2023.01)

(52) U.S. Cl.
CPC ............... *G06N 3/04* (2013.01); *G06N 3/08* (2013.01)

(58) Field of Classification Search
CPC ............ G06N 3/04; G06N 3/08; G06N 3/045; G06N 3/0475; G06N 3/048
See application file for complete search history.

(56) References Cited

U.S. PATENT DOCUMENTS

| | | | | |
|---|---|---|---|---|
| 10,693,872 B1 * | 6/2020 | Larson | ................... | H04L 9/3231 |
| 2016/0314123 A1 * | 10/2016 | Ramachandran | ............................ | G06F 16/24578 |

(Continued)

FOREIGN PATENT DOCUMENTS

| | | |
|---|---|---|
| CN | 108874972 A | 11/2018 |
| JP | 2014049118 A | 3/2014 |
| JP | 2020168233 A | 10/2020 |

OTHER PUBLICATIONS

Serban, Iulian V., et al. "A deep reinforcement learning chatbot." arXiv preprint arXiv:1709.02349 v2 (2017). (Year: 2017).*

(Continued)

*Primary Examiner* — Randall K. Baldwin
(74) *Attorney, Agent, or Firm* — Kilpatrick Townsend & Stockton LLP

(57) ABSTRACT

Disclosed herein are techniques for addressing an overconfidence problem associated with machine learning models in chatbot systems. For each layer of a plurality of layers of a machine learning model, a distribution of confidence scores is generated for a plurality of predictions with respect to an input utterance. A prediction is determined for each layer of the machine learning model based on the distribution of confidence scores generated for the layer. Based on the predictions, an overall prediction of the machine learning model is determined. A subset of the plurality of layers are iteratively processed to identify a layer whose assigned (Continued)

prediction satisfies a criterion. A confidence score associated with the assigned prediction of the layer of the machine learning model is assigned as an overall confidence score to be associated with the overall prediction of the machine learning model.

19 Claims, 9 Drawing Sheets

(56) References Cited

U.S. PATENT DOCUMENTS

| | | | |
|---|---|---|---|
| 2019/0217206 A1 | 7/2019 | Liu et al. | |
| 2020/0342850 A1 | 10/2020 | Vishnoi et al. | |
| 2021/0104231 A1* | 4/2021 | Jeon | G10L 15/22 |
| 2021/0312260 A1* | 10/2021 | Wu | G06F 40/30 |
| 2022/0215543 A1* | 7/2022 | Inoue | G16H 30/40 |

OTHER PUBLICATIONS

Zaremoodi, Poorya, and Gholamreza Haffari. "Neural machine translation for bilingually scarce scenarios: a deep multi-task learning approach." arXiv preprint arXiv:1805.04237 (2018). (Year: 2018).*

Singh, Mahesh, et al. "Knadia: Enterprise KNowledge assisted DIAlogue systems using deep learning." 2018 IEEE 34th International Conference on Data Engineering (ICDE). IEEE, 2018. (Year: 2018).*

Qu, Chen, et al. "User Intent Prediction in Information-seeking Conversations." arXiv preprint arXiv:1901.03489 (2019). (Year: 2019).*

Anantha, Raviteja, Srinivas Chappidi, and William Dawoodi. "Learning to Rank Intents in Voice Assistants." arXiv preprint arXiv:2005.00119 v2 (May 2020). (Year: 2020).*

Vamsi, G. Krishna, Akhtar Rasool, and Gaurav Hajela. "Chatbot: A deep neural network based human to machine conversation model." 2020 11th International Conference on Computing, Communication and Networking Technologies (ICCCNT). IEEE, Jul. 2020. (Year: 2020).*

Banu, Shaziya, and Shantala Devi Patil. "An intelligent web app chatbot." 2020 International Conference on Smart Technologies in Computing, Electrical and Electronics (ICSTCEE). IEEE, Oct. 2020. (Year: 2020).*

Lee et al., *A Simple Unified Framework for Detecting Out-of-Distribution Samples and Adversarial Attacks*, 32nd Conference on Neural Information Processing Systems, Oct. 27, 2018, pp. 1-20.

International Application No. PCT/US2021/059686, International Search Report and Written Opinion mailed on Mar. 1, 2022, 12 pages.

PCT/US2021/059686, "International Preliminary Report on Patentability", Jun. 15, 2023, 9 pages.

Japanese Application No. 2023-532791, Office Action mailed on Mar. 18, 2024, 4 pages (3 pages of Original Document and 1 page of English Translation).

Chinese Application No. 202180077947.0, Office Action mailed on Apr. 30, 2025, 8 pages (3 pages of Original Document and 5 pages of English Translation).

Japanese Application No. 2023-532791, Notice of Decision to Grant mailed on May 7, 2025, 6 pages (3 pages of Original Document and 3 pages of English Translation).

Chinese Application No. 202180077947.0, Office Action mailed Sep. 30, 2025, 19 pages.

* cited by examiner

METHOD AND SYSTEM FOR OVER-PREDICTION IN NEURAL NETWORKS

CROSS-REFERENCES TO RELATED APPLICATIONS

This application is a non-provisional of and claims the benefit of the filing date of U.S. Provisional Application No. 63/119,566, filed on Nov. 30, 2020, which is incorporated herein by reference in its entirety for all purposes.

FIELD

The present disclosure relates generally to chatbot systems, and more particularly, to techniques for addressing an overconfidence problem associated with machine learning models e.g., neural networks that are used in chatbot systems for classification purposes.

BACKGROUND

Many users around the world are on instant messaging or chat platforms in order to get instant reaction. Organizations often use these instant messaging or chat platforms to engage with customers (or end users) in live conversations. However, it can be very costly for organizations to employ service people to engage in live communication with customers or end users. Chatbots or bots have begun to be developed to simulate conversations with end users, especially over the Internet. End users can communicate with bots through messaging apps that the end users have already installed and used. An intelligent bot, generally powered by artificial intelligence (AI), can communicate more intelligently and contextually in live conversations, and thus may allow for a more natural conversation between the bot and the end users for improved conversational experience. Instead of the end user learning a fixed set of keywords or commands that the bot knows how to respond to, an intelligent bot may be able to understand the end user's intention based upon user utterances in natural language and respond accordingly.

However, chatbots are difficult to build because these automated solutions require specific knowledge in certain fields and the application of certain techniques that may be solely within the capabilities of specialized developers. As part of building such chatbots, a developer may first understand the needs of enterprises and end users. The developer may then analyze and make decisions related to, for example, selecting data sets to be used for the analysis, preparing the input data sets for analysis (e.g., cleansing the data, extracting, formatting, and/or transforming the data prior to analysis, performing data features engineering, etc.), identifying an appropriate machine learning (ML) technique (s) or model(s) for performing the analysis, and improving the technique or model to improve results/outcomes based upon feedback. The task of identifying an appropriate model may include developing multiple models, possibly in parallel, iteratively testing and experimenting with these models, before identifying a particular model (or models) for use. Further, supervised learning-based solutions typically involve a training phase, followed by an application (i.e., inference) phase, and iterative loops between the training phase and the application phase. The developer may be responsible for carefully implementing and monitoring these phases to achieve optimal solutions.

Typically, individual bots employ a machine learning model e.g., a neural network, which is trained as a classifier and configured to, for a given input, predict or infer a class or category for that input from a set of target classes or categories. Deeper neural networks (i.e., neural network models with many layers e.g., four or more layers) are generally more accurate in their output predictions than shallower neural networks (i.e., neural network models with few layers). However, deep neural networks suffer from the problem of overconfidence (of the confidence score), where the confidence score generated by the neural network for a class may become de-correlated from the real confidence score.

Accordingly, while deep neural networks are desirable for use because of their increased accuracy, the overconfidence problem associated with deep neural network has to be dealt with to avoid performance issues of the neural network. Embodiments described herein address these and other problems, individually and collectively.

SUMMARY

Techniques are disclosed (e.g., a method, a system, non-transitory computer-readable medium storing code or instructions executable by one or more processors) for addressing an overconfidence problem associated with machine learning models (e.g., neural networks) that are used in chatbot systems for classification purposes. Various embodiments are described herein, including methods, systems, non-transitory computer-readable storage media storing programs, code, or instructions executable by one or more processors, and the like.

An aspect of the present disclosure provides for a method comprising: generating, for each layer of a plurality of layers of a machine learning model, a distribution of confidence scores for a plurality of predictions with respect to an input utterance; determining a prediction to be assigned to each layer of the machine learning model based on the distribution of confidence scores generated for the layer; generating, based on the determining, an overall prediction of the machine learning model; iteratively processing a subset of the plurality of layers of the machine learning model to identify a layer of the machine learning model whose assigned prediction satisfies a criterion; and assigning a confidence score associated with the assigned prediction of the layer of the machine learning model as an overall confidence score to be associated with the overall prediction of the machine learning model.

According to one embodiment, there is provided a computing device comprising: a processor; and a memory including instructions that, when executed with the processor, cause the computing device to, at least: generate, for each layer of a plurality of layers of a machine learning model, a distribution of confidence scores for a plurality of predictions with respect to an input utterance; determine a prediction to be assigned to each layer of the machine learning model based on the distribution of confidence scores generated for the layer; generate an overall prediction of the machine learning model; iteratively process a subset of the plurality of layers of the machine learning model to identify a layer of the machine learning model whose assigned prediction satisfies a criterion; and assign a confidence score associated with the assigned prediction of the layer of the machine learning model as an overall confidence score to be associated with the overall prediction of the machine learning model.

An aspect of the present disclosure provides for a method comprising generating, for each layer of a plurality of layers of a machine learning model, a distribution of confidence scores for a plurality of predictions with respect to an input utterance; computing, for each prediction of the plurality of predictions, a score based on the distribution of confidence scores for the plurality of layers of the machine learning model; determining one of the plurality of predictions to correspond to an overall prediction of the machine learning model; and assigning the score associated with the one of the plurality of predictions as an overall confidence score to be associated with the overall prediction of the machine learning model.

The foregoing, together with other features and embodiments will become more apparent upon referring to the following specification, claims, and accompanying drawings.

DETAILED DESCRIPTION

Figure 1:
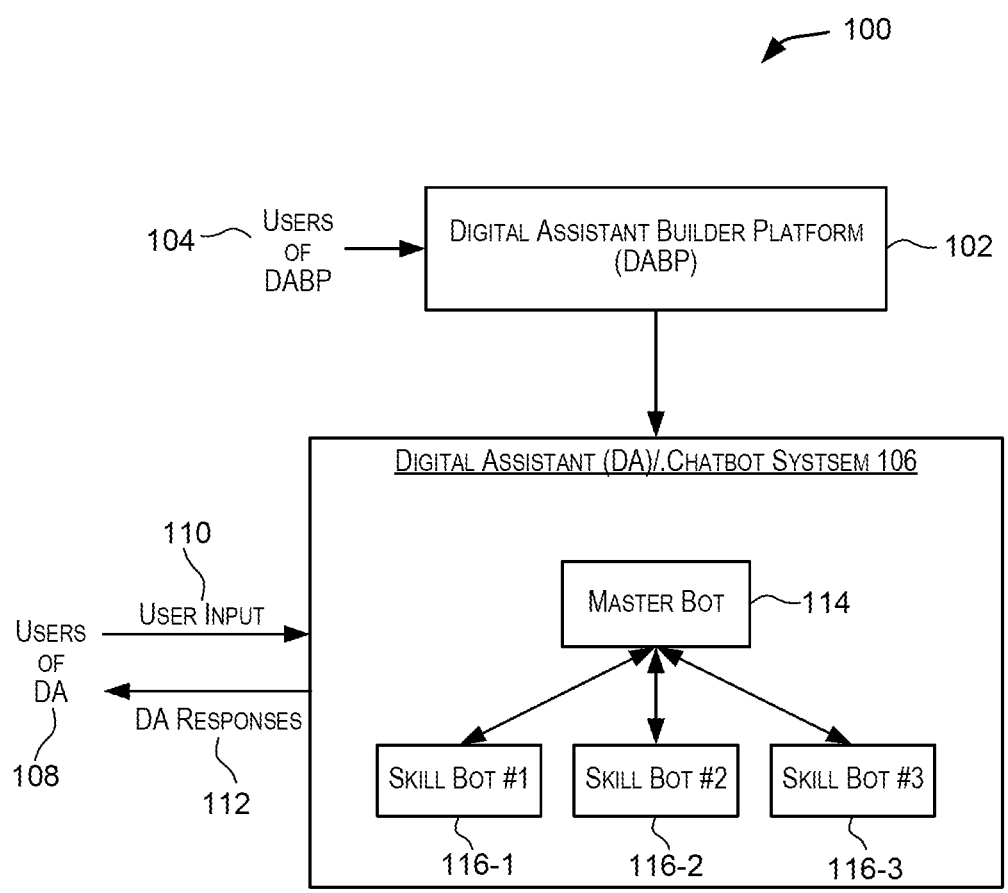
FIG. 1 is a simplified block diagram of a distributed environment incorporating an exemplary embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Although specific embodiments have been described, various modifications, alterations, alternative constructions, and equivalents are possible. Embodiments are not restricted to operation within certain specific data processing environments, but are free to operate within a plurality of data processing environments. Additionally, although certain embodiments have been described using a particular series of transactions and steps, it should be apparent to those skilled in the art that this is not intended to be limiting. Although some flowcharts describe operations as a sequential process, many of the operations can be performed in parallel or concurrently. In addition, the order of the operations may be rearranged. A process may have additional steps not included in the figure. Various features and aspects of the above-described embodiments may be used individually or jointly. The word "exemplary" is used herein to mean "serving as an example, instance, or illustration." Any embodiment or design described herein as "exemplary" is not necessarily to be construed as preferred or advantageous over other embodiments or designs.

Further, while certain embodiments have been described using a particular combination of hardware and software, it should be recognized that other combinations of hardware and software are also possible. Certain embodiments may be implemented only in hardware, or only in software, or using combinations thereof. The various processes described herein can be implemented on the same processor or different processors in any combination.

Where devices, systems, components or modules are described as being configured to perform certain operations or functions, such configuration can be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes can communicate using a variety of techniques including but not limited to conventional techniques for inter-process communications, and different pairs of processes may use different techniques, or the same pair of processes may use different techniques at different times.

Introduction

A machine learning model e.g., a neural network, that is trained as a classifier is configured to, for a given input, predict or infer a class or category for that input from a set of target classes or categories. Such a classifier neural network model is typically trained to generate a distribution of probabilities for the set of target classes, with a probability being generated by the neural network for each target class in the set and where the generated probabilities sum up to one (or 100%, if expressed as a percentage). In such a neural network classifier, the output layer of the neural network may use a softmax function as its activation function to produce the distribution of probability scores for the set of classes. These probabilities are also referred to as confidence scores. The class with the highest associated confidence score may be output as the answer for the input.

For example, in the chatbot domain, a chatbot may use a neural network model that is trained to take an utterance as input and predict, for the utterance, a distribution of probabilities or confidence scores for a set of classes for which the neural network is trained. The set of classes may, for example, include intent classes that represent intents behind the utterance. The neural network is configured to generate a confidence score for each of the intent classes, and the intent class with the highest confidence score may be selected as the most relevant intent class for the input utterance. In some embodiments, the highest confidence score also has to be above a pre-configured threshold (e.g., 70% confidence) for it to be selected as the relevant intent class for the input utterance.

The set of intent classes may include one or more in-domain classes and an out-of-domain (OOD) class. An in-domain class is one representing an intent for which processing can be handled by the particular chatbot. An OOD class is typically a class representing an unresolved intent (i.e., could not be resolved to one of the in-domain classes) that the chatbot is not configured to handle.

For example consider a chatbot ("Pizza bot") for ordering pizza. Users may interact with the Pizza bot to order and/or cancel pizza orders. The Pizza bot may be trained to take an input utterance and classify the utterance to a set of intent classes including one or more in-domain classes and an OOD class. As an example, the in-domain classes may include an "Order pizza" intent class, and a "Cancel pizza order" intent class, and the out-of-domain class may be an "Unresolved" class. Thus, if the input utterance is related to ordering a pizza, a properly trained neural network will generate the highest confidence score for the "Order pizza" class. Likewise, if the input utterance is related to canceling a pizza order, then a properly trained neural network will generate the highest confidence score for the "Cancel pizza order" class. If the utterance has nothing to do with pizza ordering or cancelling a pizza order, then a properly trained neural network may generate the highest confidence score for the OOD "Unresolved" class. Further processing performed by the Pizza bot responsive to an input utterance may be dependent upon which class received the highest confidence score for that utterance. Accordingly, assigning proper confidence scores for the set of classes for a given utterance is important for the performance of the Pizza bot.

A neural network typically has to be trained before it can be used for inferencing or making predictions. Training may be performed using training data (sometimes referred to as labeled data), where inputs and labels (ground truths) associated with those inputs are known. For example, the training data may include inputs x(i), and for each input x(i), a target value or right answer (also referred to as the ground truth) y(i) for that input. A pair of (x(i), y(i)) is called a training sample, and the training data may comprise many such training samples. For example, the training data used for training a neural network model for a chatbot may include a set of utterances, and for each utterance in the set, a known (ground truth) class for that utterance. As an example, for the Pizza bot described above, the training data may include a set of utterances with associated label "Order pizza" class, a set of utterances with associated label "Cancel pizza order" class, and a set of utterances with associated label "Unresolved" OOD class.

The space of all the inputs x(i) in the training data may be denoted by X, and the space of all the corresponding targets y(i) may be denoted by Y. The goal of training the neural network is to learn a hypothesis function "h( )" that maps the training input space X to the target value space Y, such that h(x) is a good predictor for the corresponding value of y. In some implementations, as part of deriving the hypothesis function, an objective function such as a loss function is defined that measures the difference between the ground truth value for an input and the value predicted for that input by the neural network. This objective function is optimized, i.e., minimized or maximized, as part of the training. Training techniques such as back propagation training techniques may be used that iteratively modify/manipulate the weights associated with inputs to perceptrons in the neural network with the goal to minimize or maximize the objective function associated with the output(s) provided by the neural network.

The depth of a neural network model is measured by a number of layers in the neural network model. A neural network typically has an input layer that receives inputs provided to the neural network, an output layer that outputs the results for the inputs, and one or more hidden layers between the input layer and the output layer. Deeper neural networks (i.e., neural network models with a high number of layers) are generally more accurate in their output predictions than shallower neural network models (i.e., neural network models with few layers). However, deep neural networks suffer from the problem of overconfidence (of the confidence score), where the confidence score generated by the neural network for a class may become de-correlated from the real confidence score. A deep neural network model may even produce highly confident wrong classification predictions when the actual inputs are not well represented by the training data that was used to train the neural network model, i.e., actual samples are drawn from outside the distribution observed during training i.e., the model is not well calibrated. The overconfidence makes it difficult to post-process model output (setting a threshold on predictions, etc.), which means it needs to be dealt with by architecture (typically used for aleatoric uncertainty) and/or training (e.g., typically used for epistemic uncertainty).

Accordingly, while deep machine learning models such as deep neural networks are desirable for use because of their increased accuracy, the overconfidence problem associated with deep machine learning models has to be dealt with to avoid performance issues for the neural network.

Bot System

A bot (also referred to as a skill, chatbot, chatterbot, or talkbot) is a computer program that can perform conversations with end users. The bot can generally respond to natural-language messages (e.g., questions or comments) through a messaging application that uses natural-language messages. Enterprises may use one or more bot systems to communicate with end users through a messaging application. The messaging application, which may be referred to as a channel, may be an end user preferred messaging application that the end user has already installed and familiar with. Thus, the end user does not need to download and install new applications in order to chat with the bot system. The messaging application may include, for example, over-the-top (OTT) messaging channels (such as Facebook Messenger, Facebook WhatsApp, WeChat, Line, Kik, Telegram, Talk, Skype, Slack, or SMS), virtual private assistants (such as Amazon Dot, Echo, or Show, Google Home, Apple HomePod, etc.), mobile and web app extensions that extend native or hybrid/responsive mobile apps or web applications with chat capabilities, or voice based input (such as devices or apps with interfaces that use Siri, Cortana, Google Voice, or other speech input for interaction).

FIG. 1 is a simplified block diagram of an environment 100 incorporating a chatbot system according to certain embodiments. Environment 100 comprises a digital assistant builder platform (DABP) 102 that enables users of DABP 102 to create and deploy digital assistants or chatbot systems. DABP 102 can be used to create one or more digital assistants (or DAs) or chatbot systems. For example, as shown in FIG. 1, user 104 representing a particular enterprise can use DABP 102 to create and deploy a digital assistant 106 for users of the particular enterprise. For example, DABP 102 can be used by a bank to create one or more digital assistants for use by the bank's customers. The same DABP 102 platform can be used by multiple enterprises to create digital assistants. As another example, an owner of a restaurant (e.g., a pizza shop) may use DABP 102 to create and deploy a digital assistant that enables customers of the restaurant to order food (e.g., order pizza).

FIG. 1 is a simplified block diagram of an environment 100 incorporating a chatbot system according to certain embodiments. Environment 100 comprises a digital assistant builder platform (DABP) 102 that enables users of DABP 102 to create and deploy digital assistants or chatbot systems. DABP 102 can be used to create one or more digital assistants (or DAs) or chatbot systems. For example, as shown in FIG. 1, user 104 representing a particular enterprise can use DABP 102 to create and deploy a digital assistant 106 for users of the particular enterprise. For example, DABP 102 can be used by a bank to create one or more digital assistants for use by the bank's customers. The same DABP 102 platform can be used by multiple enterprises to create digital assistants. As another example, an owner of a restaurant (e.g., a pizza shop) may use DABP 102 to create and deploy a digital assistant that enables customers of the restaurant to order food (e.g., order pizza).

A digital assistant, such as digital assistant 106 built using DABP 102, can be used to perform various tasks via natural language-based conversations between the digital assistant and its users 108. As part of a conversation, a user may provide one or more user inputs 110 to digital assistant 106 and get responses 112 back from digital assistant 106. A conversation can include one or more of inputs 110 and responses 112. Via these conversations, a user can request one or more tasks to be performed by the digital assistant and, in response, the digital assistant is configured to perform the user-requested tasks and respond with appropriate responses to the user.

User inputs 110 are generally in a natural language form and are referred to as utterances. A user utterance 110 can be in text form, such as when a user types in a sentence, a question, a text fragment, or even a single word and provides the text as input to digital assistant 106. In some embodiments, a user utterance 110 can be in audio input or speech form, such as when a user says or speaks something that is provided as input to digital assistant 106. The utterances are typically in a language spoken by the user 108. For example, the utterances may be in English, or some other language. When an utterance is in speech form, the speech input is converted to text form utterances in that particular language and the text utterances are then processed by digital assistant 106. Various speech-to-text processing techniques may be used to convert a speech or audio input to a text utterance, which is then processed by digital assistant 106. In some embodiments, the speech-to-text conversion may be done by digital assistant 106 itself.

An utterance, which may be a text utterance or a speech utterance, can be a fragment, a sentence, multiple sentences, one or more words, one or more questions, combinations of the aforementioned types, and the like. Digital assistant 106 is configured to apply natural language understanding (NLU) techniques to the utterance to understand the meaning of the user input. As part of the NLU processing for an utterance, digital assistant 106 is configured to perform processing to understand the meaning of the utterance, which involves identifying one or more intents and one or more entities corresponding to the utterance. Upon understanding the meaning of an utterance, digital assistant 106 may perform one or more actions or operations responsive to the understood meaning or intents. For purposes of this disclosure, it is assumed that the utterances are text utterances that have been provided directly by a user 108 of digital assistant 106 or are the results of conversion of input speech utterances to text form. This however is not intended to be limiting or restrictive in any manner.

For example, a user input 108 may request a pizza to be ordered by providing an utterance such as "I want to order a pizza." Upon receiving such an utterance, digital assistant 106 is configured to understand the meaning of the utterance and take appropriate actions. The appropriate actions may involve, for example, responding to the user with questions requesting user input on the type of pizza the user desires to order, the size of the pizza, any toppings for the pizza, and the like. The responses provided by digital assistant 106 may also be in natural language form and typically in the same language as the input utterance. As part of generating these responses, digital assistant 106 may perform natural language generation (NLG). For the user ordering a pizza, via the conversation between the user and digital assistant 106, the digital assistant may guide the user to provide all the requisite information for the pizza order, and then at the end of the conversation cause the pizza to be ordered. Digital assistant 106 may end the conversation by outputting information to the user indicating that the pizza has been ordered.

At a conceptual level, digital assistant 106 performs various processing in response to an utterance received from a user. In some embodiments, this processing involves a series or pipeline of processing steps including, for example, understanding the meaning of the input utterance (using NLU), determining an action to be performed in response to the utterance, where appropriate causing the action to be performed, generating a response to be output to the user responsive to the user utterance, outputting the response to the user, and the like. The NLU processing can include parsing the received input utterance to understand the structure and meaning of the utterance, refining and reforming the utterance to develop a better understandable form (e.g., logical form) or structure for the utterance. Generating a response may include using natural language generation (NLG) techniques. Thus, the natural language processing (NLP) performed by a digital assistant can include a combination of NLU and NLG processing. The NLU processing performed by a digital assistant, such as digital assistant 106, can include various NLU related processing such as sentence parsing (e.g., tokenizing, lemmatizing, identifying part-of-speech tags for the sentence, identifying named entities in the sentence, generating dependency trees to represent the sentence structure, splitting a sentence into clauses, analyzing individual clauses, resolving anaphoras, performing chunking, and the like). In certain embodiments, the NLU processing or portions thereof is performed by digital assistant 106 itself. In some other embodiments, digital assistant 106 may use other resources to perform portions of the NLU processing. For example, the syntax and structure of an input utterance sentence may be identified by processing the sentence using a parser, a part-of-speech tagger, and/or a named entity recognizer. In one implementation, for the English language, a parser, a part-of-speech tagger, and a named entity recognizer such as ones provided by the Stanford NLP Group are used for analyzing the sentence structure and syntax. These are provided as part of the Stanford CoreNLP toolkit.

While the various examples provided in this disclosure show utterances in the English language, this is meant only as an example. In certain embodiments, digital assistant 106 is also capable of handling utterances in languages other than English. Digital assistant 106 may provide subsystems (e.g., components implementing NLU functionality) that are configured for performing processing for different languages. These subsystems may be implemented as pluggable units that can be called using service calls from an NLU core server. This makes the NLU processing flexible and extensible for each language, including allowing different orders of processing. A language pack may be provided for individual languages, where a language pack can register a list of subsystems that can be served from the NLU core server.

A digital assistant, such as digital assistant 106 depicted in FIG. 1, can be made available or accessible to its users 108 through a variety of different channels, such as but not limited to, via certain applications, via social media platforms, via various messaging services and applications (e.g., an instant messaging application), and other applications or channels. A single digital assistant can have several channels configured for it so that it can be run on and be accessed by different services simultaneously.

A digital assistant or chatbot system generally contains or is associated with one or more skills. In certain embodiments, these skills are individual chatbots (referred to as skill bots) that are configured to interact with users and fulfill specific types of tasks, such as tracking inventory, submitting timecards, creating expense reports, ordering food, checking a bank account, making reservations, buying a widget, and the like. For example, for the embodiment depicted in FIG. 1, digital assistant or chatbot system 106 includes skills 116-1, 116-2, and so on. For purposes of this disclosure, the terms "skill" and "skills" are used synonymously with the terms "skill bot" and "skill bots," respectively.

Each skill associated with a digital assistant helps a user of the digital assistant complete a task through a conversation with the user, where the conversation can include a combination of text or audio inputs provided by the user and responses provided by the skill bots. These responses may be in the form of text or audio messages to the user and/or provided using simple user interface elements (e.g., select lists) that are presented to the user for the user to make selections.

There are various ways in which a skill or skill bot can be associated or added to a digital assistant. In some instances, a skill bot can be developed by an enterprise and then added to a digital assistant using DABP 102, e.g., through a user interface provided by DABP 102 for registering the skill bot with the digital assistant. In other instances, a skill bot can be developed and created using DABP 102 and then added to a digital assistant created using DABP 102. In yet other instances, DABP 102 provides an online digital store (referred to as a "skills store") that offers multiple skills directed to a wide range of tasks. The skills offered through the skills store may also expose various cloud services. In order to add a skill to a digital assistant being generated using DABP 102, a user of DABP 102 can access the skills store via DABP 102, select a desired skill, and indicate that the selected skill is to be added to the digital assistant created using DABP 102. A skill from the skills store can be added to a digital assistant as is or in a modified form (for example, a user of DABP 102 may select and clone a particular skill bot provided by the skills store, make customizations or modifications to the selected skill bot, and then add the modified skill bot to a digital assistant created using DABP 102).

Various different architectures may be used to implement a digital assistant or chatbot system. For example, in certain embodiments, the digital assistants created and deployed using DABP 102 may be implemented using a master bot/child (or sub) bot paradigm or architecture. According to this paradigm, a digital assistant is implemented as a master bot that interacts with one or more child bots that are skill bots. For example, in the embodiment depicted in FIG. 1, digital assistant 106 comprises a master bot 114 and skill bots 116-1, 116-2, etc. that are child bots of master bot 114. In certain embodiments, digital assistant 106 is itself considered to act as the master bot.

A digital assistant implemented according to the master-child bot architecture enables users of the digital assistant to interact with multiple skills through a unified user interface, namely via the master bot. When a user engages with a digital assistant, the user input is received by the master bot. The master bot then performs processing to determine the meaning of the user input utterance. The master bot then determines whether the task requested by the user in the utterance can be handled by the master bot itself, else the master bot selects an appropriate skill bot for handling the user request and routes the conversation to the selected skill bot. This enables a user to converse with the digital assistant through a common single interface and still provide the capability to use several skill bots configured to perform specific tasks. For example, for a digital assistant developed for an enterprise, the master bot of the digital assistant may interface with skill bots with specific functionalities, such as a CRM bot for performing functions related to customer relationship management (CRM), an ERP bot for performing functions related to enterprise resource planning (ERP), an HCM bot for performing functions related to human capital management (HCM), etc. This way the end user or consumer of the digital assistant need only know how to access the digital assistant through the common master bot interface and behind the scenes multiple skill bots are provided for handling the user request.

In certain embodiments, in a master bot/child bots infrastructure, the master bot is configured to be aware of the available list of skill bots. The master bot may have access to metadata that identifies the various available skill bots, and for each skill bot, the capabilities of the skill bot including the tasks that can be performed by the skill bot. Upon receiving a user request in the form of an utterance, the master bot is configured to, from the multiple available skill bots, identify or predict a specific skill bot that can best serve or handle the user request. The master bot then routes the utterance (or a portion of the utterance) to that specific skill bot for further handling. Control thus flows from the master bot to the skill bots. The master bot can support multiple input and output channels. In certain embodiments, routing may be performed with the aid of processing performed by one or more available skill bots. For example, as discussed below, a skill bot can be trained to infer an intent for an utterance and to determine whether the inferred intent matches an intent with which the skill bot is configured. Thus, the routing performed by the master bot can involve the skill bot communicating to the master bot an indication of whether the skill bot has been configured with an intent suitable for handling the utterance.

While the embodiment in FIG. 1 shows digital assistant 106 comprising a master bot 114 and skill bots 116-1, 116-2, and 116-3, this is not intended to be limiting. A digital assistant can include various other components (e.g., other systems and subsystems) that provide the functionalities of the digital assistant. These systems and subsystems may be implemented only in software (e.g., code, instructions stored on a computer-readable medium and executable by one or more processors), in hardware only, or in implementations that use a combination of software and hardware.

DABP 102 provides an infrastructure and various services and features that enable a user of DABP 102 to create a digital assistant including one or more skill bots associated with the digital assistant. In some instances, a skill bot can be created by cloning an existing skill bot, for example, cloning a skill bot provided by the skills store. As previously indicated, DABP 102 can provide a skills store or skills catalog that offers multiple skill bots for performing various tasks. A user of DABP 102 can clone a skill bot from the skills store. As needed, modifications or customizations may be made to the cloned skill bot. In some other instances, a user of DABP 102 creates a skill bot from scratch using tools and services offered by DABP 102.

In certain embodiments, at a high level, creating or customizing a skill bot involves the following steps:

(1) Configuring settings for a new skill bot
(2) Configuring one or more intents for the skill bot
(3) Configuring one or more entities for one or more intents
(4) Training the skill bot
(5) Creating a dialog flow for the skill bot
(6) Adding custom components to the skill bot as needed
(7) Testing and deploying the skill bot Each of the above steps is briefly described below.

(1) Configuring settings for a new skill bot—Various settings may be configured for the skill bot. For example, a skill bot designer can specify one or more invocation names for the skill bot being created. These invocation names, which serve as identifiers for the skill bot, can then be used by users of a digital assistant to explicitly invoke the skill bot. For example, a user can include an invocation name in the user's utterance to explicitly invoke the corresponding skill bot.

(2) Configuring one or more intents and associated example utterances for the skill bot—The skill bot designer specifies one or more intents (also referred to as bot intents) for a skill bot being created. The skill bot is then trained based upon these specified intents. These intents represent categories or classes that the skill bot is trained to infer for input utterances. Upon receiving an utterance, a trained skill bot infers an intent for the utterance, where the inferred intent is selected from the predefined set of intents used to train the skill bot. The skill bot then takes an appropriate action responsive to an utterance based upon the intent inferred for that utterance. In some instances, the intents for a skill bot represent tasks that the skill bot can perform for users of the digital assistant. Each intent is given an intent identifier or intent name. For example, for a skill bot trained for a bank, the intents specified for the skill bot may include "CheckBalance," "TransferMoney," "DepositCheck," and the like.

For each intent defined for a skill bot, the skill bot designer may also provide one or more example utterances that are representative of and illustrate the intent. These example utterances are meant to represent utterances that a user may input to the skill bot for that intent. For example, for the CheckBalance intent, example utterances may include "What's my savings account balance?", "How much is in my checking account?", "How much money do I have in my account," and the like. Accordingly, various permutations of typical user utterances may be specified as example utterances for an intent.

The intents and their associated example utterances are used as training data to train the skill bot. Various different training techniques may be used. As a result of this training, a predictive model is generated that is configured to take an utterance as input and output an intent inferred for the utterance by the predictive model. In some instances, input utterances are provided to an intent analysis engine (e.g., a rules-based or machine-learning based classifier executed by the skill bot), which is configured to use the trained model to predict or infer an intent for the input utterance. The skill bot may then take one or more actions based upon the inferred intent.

(3) Configuring entities for one or more intents of the skill bot—In some instances, additional context may be needed to enable the skill bot to properly respond to a user utterance. For example, there may be situations where a user input utterance resolves to the same intent in a skill bot. For instance, in the above example, utterances "What's my savings account balance?" and "How much is in my checking account?" both resolve to the same CheckBalance intent, but these utterances are different requests asking for different things. To clarify such requests, one or more entities can be added to an intent. Using the banking skill bot example, an entity called AccountType, which defines values called "checking" and "saving" may enable the skill bot to parse the user request and respond appropriately. In the above example, while the utterances resolve to the same intent, the value associated with the AccountType entity is different for the two utterances. This enables the skill bot to perform possibly different actions for the two utterances in spite of them resolving to the same intent. One or more entities can be specified for certain intents configured for the skill bot. Entities are thus used to add context to the intent itself. Entities help describe an intent more fully and enable the skill bot to complete a user request.

In certain embodiments, there are two types of entities: (a) built-in entities provided by DABP 102, and (2) custom entities that can be specified by a skill bot designer. Built-in entities are generic entities that can be used with a wide variety of bots. Examples of built-in entities include, without limitation, entities related to time, date, addresses, numbers, email addresses, duration, recurring time periods, currencies, phone numbers, URLs, and the like. Custom entities are used for more customized applications. For example, for a banking skill, an AccountType entity may be defined by the skill bot designer that enables various banking transactions by checking the user input for keywords like checking, savings, and credit cards, etc.

(4) Training the skill bot—A skill bot is configured to receive user input in the form of utterances, parse or otherwise process the received input, and identify or select an intent that is relevant to the received user input. As indicated above, the skill bot has to be trained for this. In certain embodiments, a skill bot is trained based upon the intents configured for the skill bot and the example utterances associated with the intents (collectively, the training data), so that the skill bot can resolve user input utterances to one of its configured intents. In certain embodiments, the skill bot uses a predictive model that is trained using the training data and allows the skill bot to discern what users say (or in some cases, are trying to say). DABP 102 provides various different training techniques that can be used by a skill bot designer to train a skill bot, including various machine-learning based training techniques, rules-based training techniques, and/or combinations thereof. In certain embodiments, a portion (e.g., 80%) of the training data is used to train a skill bot model and another portion (e.g., the remaining 20%) is used to test or verify the model. Once trained, the trained model (also sometimes referred to as the trained skill bot) can then be used to handle and respond to user utterances. In certain cases, a user's utterance may be a question that requires only a single answer and no further conversation. In order to handle such situations, a Q&A (question-and-answer) intent may be defined for a skill bot. Q&A intents are created in a similar manner as regular intents. The dialog flow for Q&A intents can be different from that for regular intents. For example, unlike regular intents, the dialog flow for a Q&A intent may not involve prompts for soliciting additional information (e.g., the value for a particular entity) from the user.

(5) Creating a dialog flow for the skill bot—A dialog flow specified for a skill bot describes how the skill bot reacts as different intents for the skill bot are resolved responsive to received user input. The dialog flow defines operations or actions that a skill bot will take, e.g., how the skill bot responds to user utterances, how the skill bot prompts users for input, and how the skill bot returns data. A dialog flow is like a flowchart that is followed by the skill bot. The skill bot designer specifies a dialog flow using a language, such as markdown language. In certain embodiments, a version of YAML called OBotML may be used to specify a dialog flow for a skill bot. The dialog flow definition for a skill bot acts as a model for the conversation itself, one that lets the skill bot designer choreograph the interactions between a skill bot and the users that the skill bot services.

In certain embodiments, the dialog flow definition for a skill bot contains three sections:
  (a) a context section
  (b) a default transitions section
  (c) a states section Context section—The skill bot designer can define variables that are used in a conversation flow in the context section. Other variables that may be named in the context section include, without limitation: variables for error handling, variables for built-in or custom entities, user variables that enable the skill bot to recognize and persist user preferences, and the like.

Default transitions section—Transitions for a skill bot can be defined in the dialog flow states section or in the default transitions section. The transitions defined in the default transition section act as a fallback and get triggered when there are no applicable transitions defined within a state, or the conditions required to trigger a state transition cannot be met. The default transitions section can be used to define routing that allows the skill bot to gracefully handle unexpected user actions.

States section—A dialog flow and its related operations are defined as a sequence of transitory states, which manage the logic within the dialog flow. Each state node within a dialog flow definition names a component that provides the functionality needed at that point in the dialog. States are thus built around the components. A state contains component-specific properties and defines the transitions to other states that get triggered after the component executes.

Special case scenarios may be handled using the states section. For example, there might be times when it is desirable to provide users the option to temporarily leave a first skill they are engaged with to do something in a second skill within the digital assistant. For example, if a user is engaged in a conversation with a shopping skill (e.g., the user has made some selections for purchase), the user may want to jump to a banking skill (e.g., the user may want to ensure that he/she has enough money for the purchase), and then return to the shopping skill to complete the user's order. To address this, the states section in the dialog flow definition of the first skill can be configured to initiate an interaction with the second different skill in the same digital assistant and then return to the original dialog flow.

(6) Adding custom components to the skill bot—As described above, states specified in a dialog flow for a skill bot name components that provide the functionality needed corresponding to the states. Components enable a skill bot to perform functions. In certain embodiments, DABP 102 provides a set of preconfigured components for performing a wide range of functions. A skill bot designer can select one of more of these preconfigured components and associate them with states in the dialog flow for a skill bot. The skill bot designer can also create custom or new components using tools provided by DABP 102 and associate the custom components with one or more states in the dialog flow for a skill bot.

(7) Testing and deploying the skill bot—DABP 102 provides several features that enable the skill bot designer to test a skill bot being developed. The skill bot can then be deployed and included in a digital assistant.

While the description above describes how to create a skill bot, similar techniques may also be used to create a digital assistant (or the master bot). At the master bot or digital assistant level, built-in system intents may be configured for the digital assistant. These built-in system intents are used to identify general tasks that the digital assistant itself (i.e., the master bot) can handle without invoking a skill bot associated with the digital assistant. Examples of system intents defined for a master bot include: (1) Exit: applies when the user signals the desire to exit the current conversation or context in the digital assistant; (2) Help: applies when the user asks for help or orientation; and (3) Unresolved Intent: applies to user input that doesn't match well with the exit and help intents. The digital assistant also stores information about the one or more skill bots associated with the digital assistant. This information enables the master bot to select a particular skill bot for handling an utterance.

At the master bot or digital assistant level, when a user inputs a phrase or utterance to the digital assistant, the digital assistant is configured to perform processing to determine how to route the utterance and the related conversation. The digital assistant determines this using a routing model, which can be rules-based, AI-based, or a combination thereof. The digital assistant uses the routing model to determine whether the conversation corresponding to the user input utterance is to be routed to a particular skill for handling, is to be handled by the digital assistant or master bot itself per a built-in system intent, or is to be handled as a different state in a current conversation flow.

In certain embodiments, as part of this processing, the digital assistant determines if the user input utterance explicitly identifies a skill bot using its invocation name. If an invocation name is present in the user input, then it is treated as explicit invocation of the skill bot corresponding to the invocation name. In such a scenario, the digital assistant may route the user input to the explicitly invoked skill bot for further handling. If there is no specific or explicit invocation, in certain embodiments, the digital assistant evaluates the received user input utterance and computes confidence scores for the system intents and the skill bots associated with the digital assistant. The score computed for a skill bot or system intent represents how likely the user input is representative of a task that the skill bot is configured to perform or is representative of a system intent. Any system intent or skill bot with an associated computed confidence score exceeding a threshold value (e.g., a Confidence Threshold routing parameter) is selected as a candidate for further evaluation. The digital assistant then selects, from the identified candidates, a particular system intent or a skill bot for further handling of the user input utterance. In certain embodiments, after one or more skill bots are identified as candidates, the intents associated with those candidate skills are evaluated (using the trained model for each skill) and confidence scores are determined for each intent. In general, any intent that has a confidence score exceeding a threshold value (e.g., 70%) is treated as a candidate intent. If a particular skill bot is selected, then the user utterance is routed to that skill bot for further processing. If a system intent is selected, then one or more actions are performed by the master bot itself according to the selected system intent.

Techniques for Addressing Overconfidence Problem

According to some embodiments, a chatbot uses a neural network model that is trained to take an utterance as input and predict, for the utterance, a distribution of probabilities or confidence scores for a set of classes for which the neural network is trained. The set of classes may, for example, include intent classes that represent intents behind the utterance. The neural network is configured to generate a confidence score for each of the intent classes, and the intent class with the highest confidence score may be selected as the most relevant intent class for the input utterance. In some embodiments, the highest confidence score also has to be above a pre-configured threshold (e.g., 70% confidence) for it to be selected as the relevant intent class for the input utterance.

Figure 2:
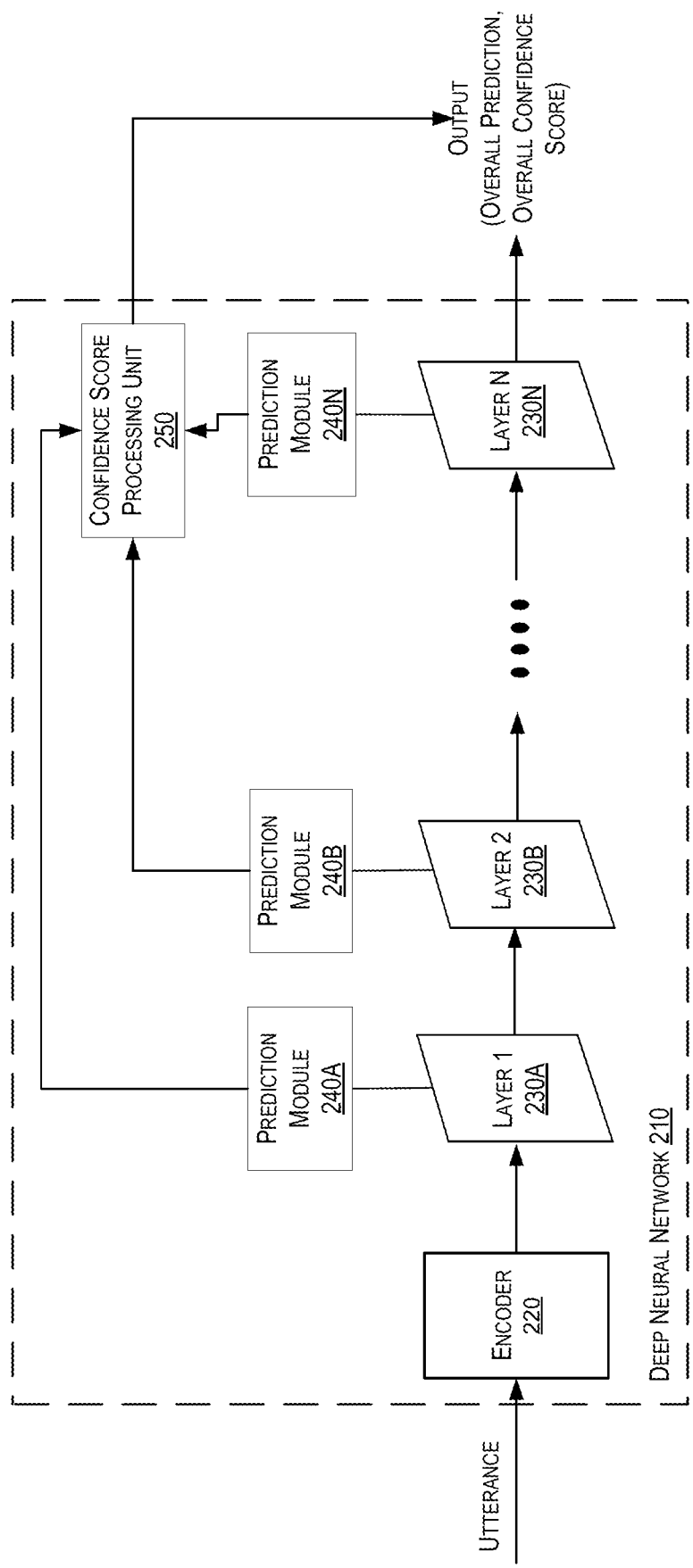
FIG. 2 depicts an exemplary neural network model in accordance with various embodiments.

FIG. 2 depicts an exemplary machine learning model in accordance with various embodiments. The machine learning model depicted in FIG. 2 is a deep neural network (DNN) 210, which comprises an encoder 220, a plurality of layers 230A, 230B . . . and, 230N, a plurality of prediction modules 240A, 240B . . . and 240N, and a confidence score processing unit 250. Each layer is associated with a corresponding prediction module. For instance, layer 1 230A is associated with prediction module 240A, layer 2 230B is associated with prediction module 240B, and layer 3 230N is associated with prediction module 240N, respectively.

An utterance is input to the encoder 220 that generates an embedding of the utterance. In some instances, the encoder 220 may be a multi-lingual universal sentence encoder (MUSE) that maps natural language elements (e.g., sentences, words, n-grams (i.e., collection of n words or letters)) into an array of numbers i.e., the embedding. Each of the layers 230A, 230B, and 230N of the deep neural network 210 sequentially process the embedding. Specifically, a prediction module 240A associated with the first layer i.e., layer 230A generates a distribution of confidence scores associated with the first layer based on the embedding, whereas a prediction module 240B associated with the second layer i.e., layer 230B generates a distribution of confidence scores associated with the second layer based on the embedding processed by the first layer. Each layer thereafter, utilizes its corresponding prediction module to generate a distribution to be associated with the layer based on the processing performed by the previous layer. Each layer of the DNN 210 is configured to generate a distribution of probabilities (i.e., confidence scores) for a set of classes e.g., intent classes that represent intents behind the utterance. More specifically, at each layer, the corresponding prediction module generates a distribution of confidence scores for the set of intent classes. The output of the DNN is an overall prediction/classification and an overall confidence score that is to be assigned to the overall prediction.

It is appreciated that each layer of the DNN comprises one or more neurons (i.e., processing entities). Neurons of a particular layer are connected to neurons of a subsequent layer. Each connection between the neurons is associated with a weight, where the weight indicates an importance of the input value(s) for the neuron. Further, each neuron is associated with an activation function, which processes the respective inputs to the neuron. It is appreciated that a different activation function can be assigned to each neuron or layer of the DNN. In this manner, each layer processes the inputs in a unique manner (i.e., based on the activation functions and weights) and the associated prediction module of each layer generates a distribution of confidence scores for set the intent classes based on the processing performed by each layer.

Typically, a neural network model assigns the intent having the highest confidence score in the last layer (i.e., layer N) as being the overall prediction of the model. Additionally, the confidence score associated with such an intent (in the last layer e.g., layer 230N which is the output layer of the DNN) is assigned as the overall confidence score of the model. In doing so, the neural network model may encounter the overconfidence problem i.e., the confidence score generated by the neural network becomes de-correlated from the real confidence score. In order to address the overconfidence problem, the deep neural network 210 determines, via the confidence score processing unit 250, an overall prediction and an overall confidence score that is to be associated with the overall prediction, in a manner that is different than the processing performed by a typical neural network. Specifically, described below are techniques (referred to herein as an iterative technique and an ensemble technique) for determining an overall prediction and an overall confidence score that is to be associated with the overall prediction of the DNN.

The confidence score processing unit 250 obtains a distribution of confidence scores computed for each layer, by the corresponding prediction module. Specifically, each prediction module is trained to generate a distribution of confidence scores based on the processing performed by the corresponding layer of the DNN 210. For instance, layer 1 230A processes the embedding generated by the encoder 220. The prediction module 240A generates a distribution of confidence scores (associated with the different intents) based on the embedding processed by layer 1 230A. Subsequently, layer 2 230B receives as input, the processed embedding from layer 1 230A, and performs further processing on the embedding. The prediction module 240B that is associated with layer 2 230B is trained to generate a distribution of confidence scores (for the different intents) based on the processing performed by layer 2 230B.

According to one embodiment, the confidence score processing unit 250 determines a prediction to be assigned to each layer of the DNN 210. For each layer of the DNN 210, the confidence score processing unit 250 determines the prediction having the highest confidence score (from the corresponding distribution of confidence scores generated by the associated prediction module of the layer) as the prediction to be assigned for the layer. Further, the confidence score processing unit 250 selects as an overall prediction of the model to correspond to the assigned prediction of the last layer (i.e., output layer, layer N 240N) of the DNN 210.

In order to assign an overall confidence score to the overall prediction, in the iterative technique approach, the confidence score processing unit 250 iterates over layers i=1 to N−1 and compares the assigned prediction of layer i to the overall prediction (i.e., assigned prediction of the last layer). When a match is found, the confidence score processing unit 250 stops further processing, and assigns the confidence score associated with the assigned prediction of the $i^{th}$ layer (i.e., the layer whose prediction matches the overall prediction) as the overall confidence that is to be associated with the overall prediction of the DNN 210. In other words, the DNN model uses the prediction of the last layer (to account for high accuracy) and the confidence score of the $i^{th}$ layer (to help mitigate the overconfidence problem).

It is appreciated that the term last layer corresponds to the layer of the DNN (e.g., layer 230N of FIG. 2) that last processes the input utterance. For instance, as the layers depicted in FIG. 2 are arranges in a horizontal manner (i.e., from left to right), layer 230 N is deemed as the last layer that processes the input utterance. However, it is noted that the DNN may be arranged in a different manner e.g., in a pyramid structure i.e., top-down (or bottom-up) manner. In this case as well, the last layer may either be the bottom layer (or top layer) of the pyramid structure and corresponds to the layer that last processes the input utterance from the user.

Figure 3:
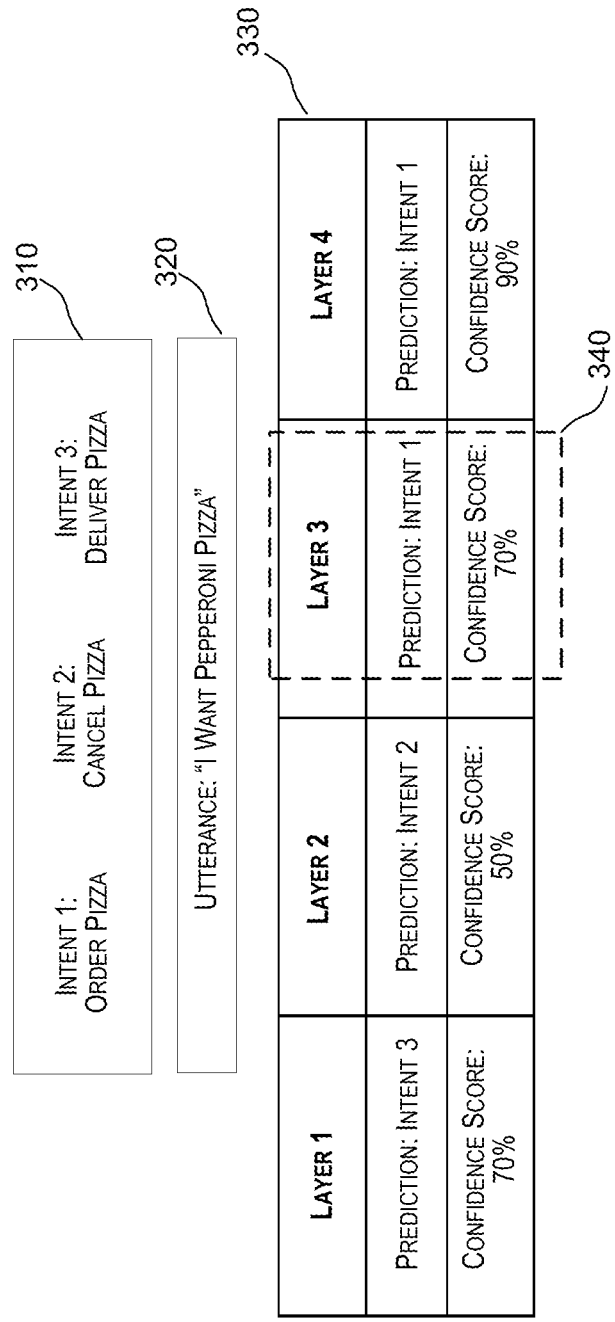
FIG. 3 illustrates an example classification performed by the neural network model in accordance with various embodiments.

Turning to FIG. 3, there is depicted an exemplary classification performed by the DNN 210 of FIG. 2 in accordance with various embodiments of the present disclosure. For sake of illustration, a pizza bot is considered comprising a set of intent classes 310, an input utterance 320, and a DNN model having N=4 layers. Additionally, for sake of simplicity, it is assumed that the set of intent classes 310 includes three intents: Intent 1—"order pizza", Intent 2—"cancel pizza", and Intent 3—"deliver pizza". The input utterance 320 is assumed to be "I want pepperoni pizza". Moreover, it should be understood that more than four layers would typically be implemented for a deep neural network. However for sake of simplicity this example uses only four layers.

In FIG. 3, Table 330 depicts the assigned predictions for each of the four layers of the DNN. It is appreciated that at each of the four layers, the assigned prediction corresponds to the prediction having the highest confidence score. For instance, the prediction of layer 1 is "deliver pizza" (Intent 3), with a confidence score of 70%, the prediction of layer 2 is "cancel pizza" (Intent 2), with a confidence score of 50%, the prediction of layer 3 is "order pizza" (Intent 1), with a confidence score of 70%, and the prediction of layer 4 is "order pizza" (Intent 1), with a confidence score of 90%.

According to some embodiments, an overall prediction of the model is determined to be the assigned prediction of the last layer of the DNN. For example, referring to FIG. 3, the overall prediction of the DNN model is Intent 1 i.e., the assigned intent of layer 4 having the highest confidence score in the last layer. In order to assign an overall confidence score to the overall prediction, the confidence score processing unit of the DNN iterates over layers i=1 to N−1 and compares the prediction of layer i to the overall prediction (i.e., prediction of the last layer). When a match is found, further processing is ceased and the confidence score of the $i^{th}$ layer (i.e., the layer whose prediction matches the overall prediction) is assigned as the overall confidence that is to be associated with the overall prediction. For instance, referring to FIG. 3, the confidence score of layer 3, 340 (i.e., 70%) is determined to be the overall confidence score of the DNN model. It is appreciated that layer 3 is the first layer (in the range from layer 1 to layer 3) whose prediction matches the overall prediction of the model (i.e., prediction of the last layer i.e., layer 4). Thus, the DNN model uses the prediction of the last layer (to account for high accuracy) and the confidence score of the $i^{th}$ layer (to help mitigate the overconfidence problem).

Turning back to FIG. 2, according to some embodiments, in the ensemble mechanism of determining an overall prediction and an overall confidence score that is to be associated with the overall prediction of the DNN, the confidence score processing unit 250 of the DNN 210 computes an ensemble score (i.e., an average score) for each intent class based on the distribution of confidence scores generated for each layer of the DNN 210. Specifically, the confidence score processing unit 250 computes: probability (intent_i|x)=avg (probability_layer_k (intent_i|x)), wherein k iterates over the range 1→N. Details pertaining to the ensemble computation are described next with reference to FIG. 4.

Figure 4:
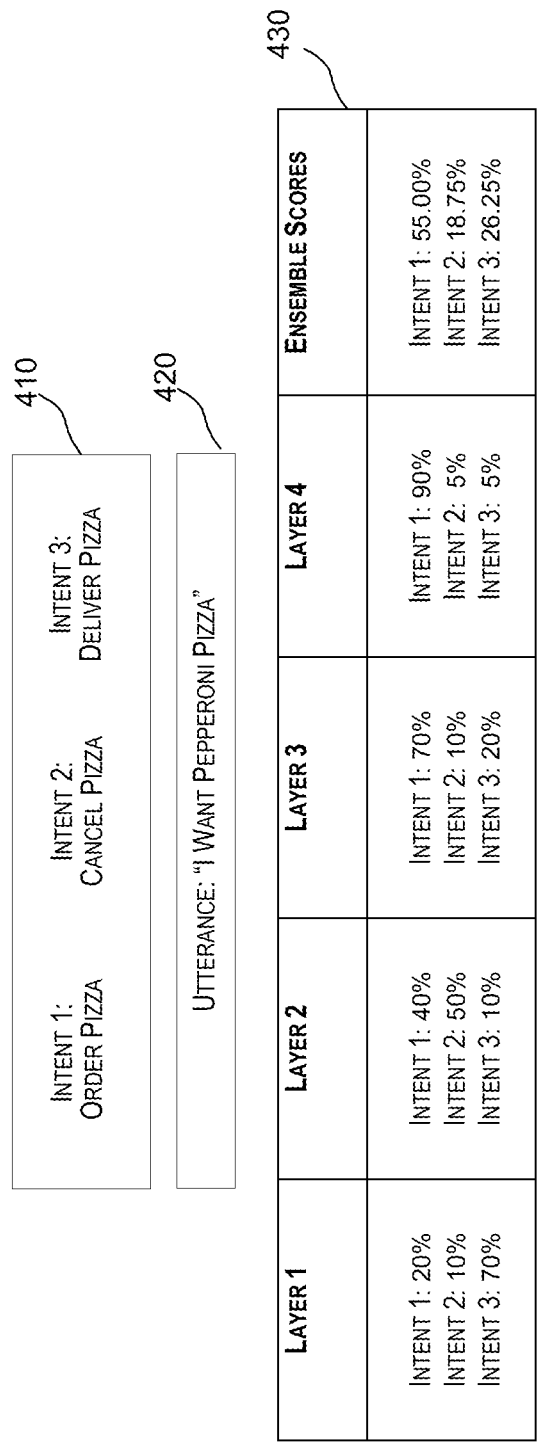
FIG. 4 illustrates another example classification performed by the neural network model in accordance with various embodiments.

FIG. 4 illustrates an example classification performed by the DNN model 210 of FIG. 2 in accordance with various embodiments. For sake of illustration, a pizza bot is considered comprising a set of intent classes 410, an input utterance 420, and a DNN model having N=4 layers. Additionally, for sake of simplicity, it is assumed that the set of intent classes 410 includes three intents: Intent 1—"order pizza", Intent 2—"cancel pizza", and Intent 3—"deliver pizza". The input utterance 420 is assumed to be "I want pepperoni pizza". Moreover, it should be understood that more than four layers would typically be implemented for a deep neural network. However, for sake of simplicity this example uses only four layers.

In FIG. 4, Table 430 depicts the predictions for each of the four layers of the DNN 210. For instance, the prediction distributions at each layer are as follows:
Layer 1
  Intent 1: order pizza, 20%
  Intent 2: cancel pizza, 10%
  Intent 3: deliver pizza, 70%
Layer 2
  Intent 1: order pizza, 40%
  Intent 2: cancel pizza, 50%
  Intent 3: deliver pizza, 10%
Layer 3
  Intent 1: order pizza, 70%
  Intent 2: cancel pizza, 10%
  Intent 3: deliver pizza, 20%
Layer 4
  Intent 1: order pizza, 90%
  Intent 2: cancel pizza, 5%
  Intent 3: deliver pizza, 5%

In the ensemble mechanism of determining the overall prediction and the overall confidence score that is to be associated with the overall prediction of the DNN, the prediction distributions of each layer are computed in a manner similar to the iterative approach. Furthermore, similar to the iterative approach, the DNN model 210 determines the overall prediction of the model to correspond to be the prediction of the last layer of the DNN that has the highest ensemble score. However, in the ensemble approach, the generation of the overall confidence score differs from the iterative approach as described below.

The confidence score processing unit 250 takes as input, the predictions made by the prediction module of each layer and computes an ensemble score (e.g., an average score) for each intent class as follows:
Ensemble Scores:
  Intent 1: order pizza (0.2+0.4+0.7+0.9)/4=55%
  Intent 2: cancel pizza (0.1+0.5+0.1+0.05)/4=18.75%
  Intent 3: delivery pizza (0.7+0.1+0.2+0.05)/4=26.25%

Specifically, the confidence score processing unit 250 computes the ensemble score for each intent to correspond to an average confidence score for the intent based on the distribution of confidence scores for each layer of the DNN model 210. For instance, referring to FIG. 4, the overall prediction of the DNN model is determined to be Intent 1 i.e., the intent of the last layer (i.e., layer 4) having the highest confidence score (i.e., 90%). Further, the DNN model assigns the ensemble score (corresponding to the determined overall intent i.e., intent 1) as the overall confidence score of the model. That is, in the example shown in FIG. 4, the DNN model assigns the score of 55% as the overall confidence score of the model.

Figure 5A:
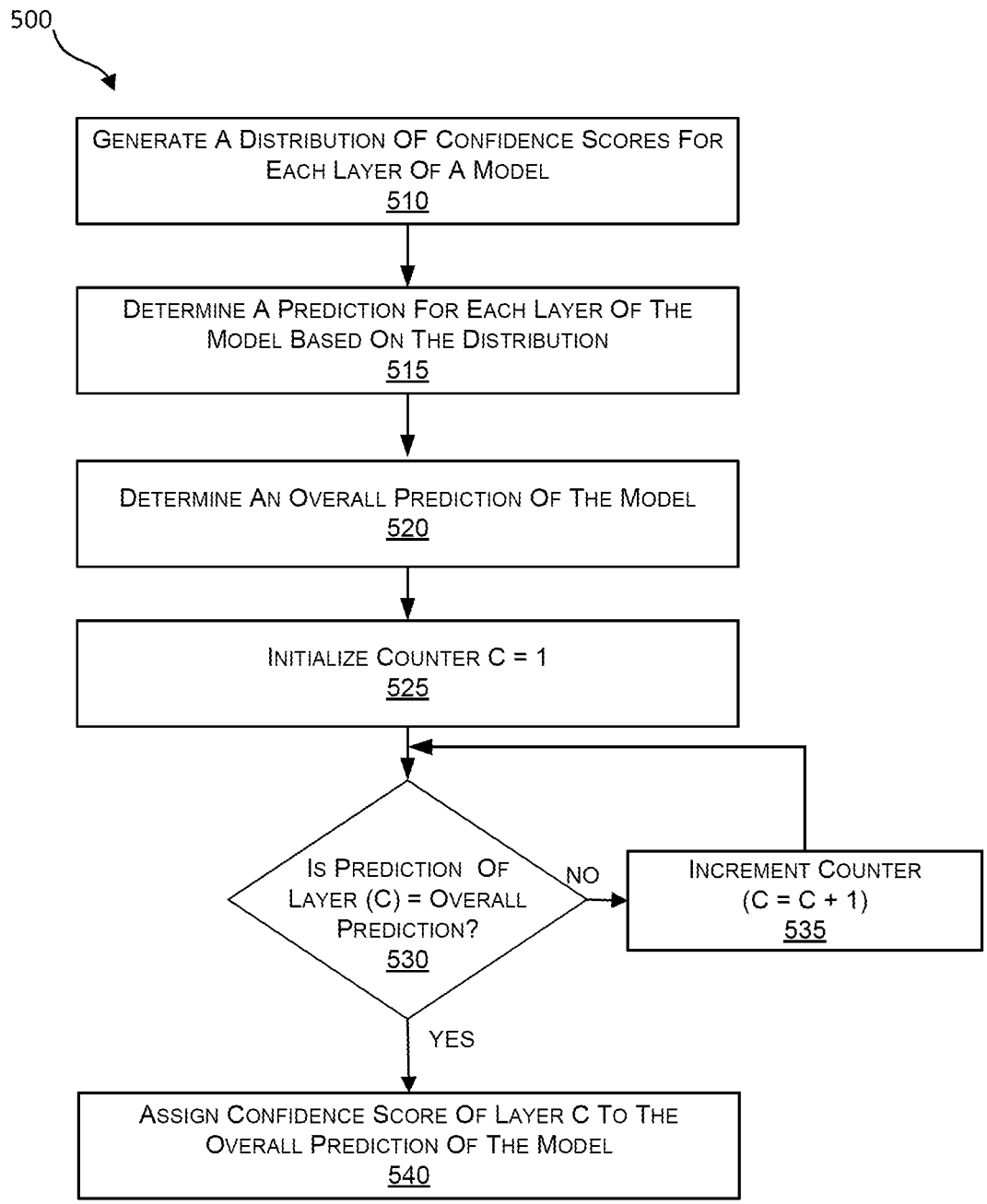
FIG. 5A depicts a flowchart illustrating a process performed by the neural network in accordance with various embodiments.

FIG. 5A depicts a flowchart 500 illustrating a process performed by the deep neural network (DNN) model in accordance with various embodiments. Specifically, FIG. 5A depicts a flowchart illustrating the iterative technique for determining an overall prediction and an overall confidence score of the DNN. The processing depicted in FIG. 5A may be implemented in software (e.g., code, instructions, program) executed by one or more processing units (e.g., processors, cores) of the respective systems, hardware, or combinations thereof. The software may be stored on a non-transitory storage medium (e.g., on a memory device). The method presented in FIG. 5A and described below is intended to be illustrative and non-limiting. Although FIG. 5A depicts the various processing steps occurring in a particular sequence or order, this is not intended to be limiting. In certain alternative embodiments, the steps may be performed in some different order or some steps may also be performed in parallel. In certain embodiments, the processing depicted in FIG. 5A may be performed by the confidence score processing unit 250 discussed with respect to FIGS. 2 and 3.

The process commences in step 510, where a distribution of confidence scores is generated for each layer of the DNN model with respect to an input utterance. For instance, a prediction module associated with each layer of the DNN model generates the distribution of confidence scores associated with the layer. In step 515, a prediction is determined for each layer of the DNN model based on the generated distribution. Specifically, the confidence score processing unit 250 determines the prediction having the highest confidence score (from the corresponding distribution of confidence scores associated with the layer) as the prediction for the layer and thereafter assigns the determined prediction to the layer. For example, referring to FIG. 4, the prediction assigned to layer 1 is intent 3, as intent 3 has the highest confidence score in the distribution of confidence scores associated with layer 1 i.e., intent 1 (20%), intent 2 (10%), and intent 3 (70%).

The process then moves to step 520, where the DNN model determines an overall prediction of the model. In some embodiments, the overall prediction is the prediction assigned to the last layer (i.e., layer N) of the DNN model. It is appreciated that the prediction assigned to the last layer corresponds to the prediction having the highest confidence score from the distribution of predictions scores associated with the last layer.

In step 525, a value of a counter (C) is initialized to one. The counter C is utilized to iterate through a subset of the plurality of layers of the DNN. For instance, for a DNN model comprising k=N layers, the value of the counter C may iterate from layer k=1 to layer k=N−1. The process thereafter moves to step 530, where a query is performed to determine whether the assigned prediction of layer (C) of the DNN model is the same as the overall prediction of the model. If the response to the query is affirmative, the process moves to step 540, else, if the response to the query is negative, the process moves to step 535. In step 535, the value of the counter (C) is incremented by 1, and the process loops back to step 530 to evaluate the assigned prediction of the next layer.

Upon successfully identifying a layer of the DNN whose assigned prediction is the same as the overall prediction of the model, in step 540, the confidence score associated with the identified layer is assigned as the overall confidence score that is to be associated with the overall prediction of the DNN model 210.

Figure 5B:
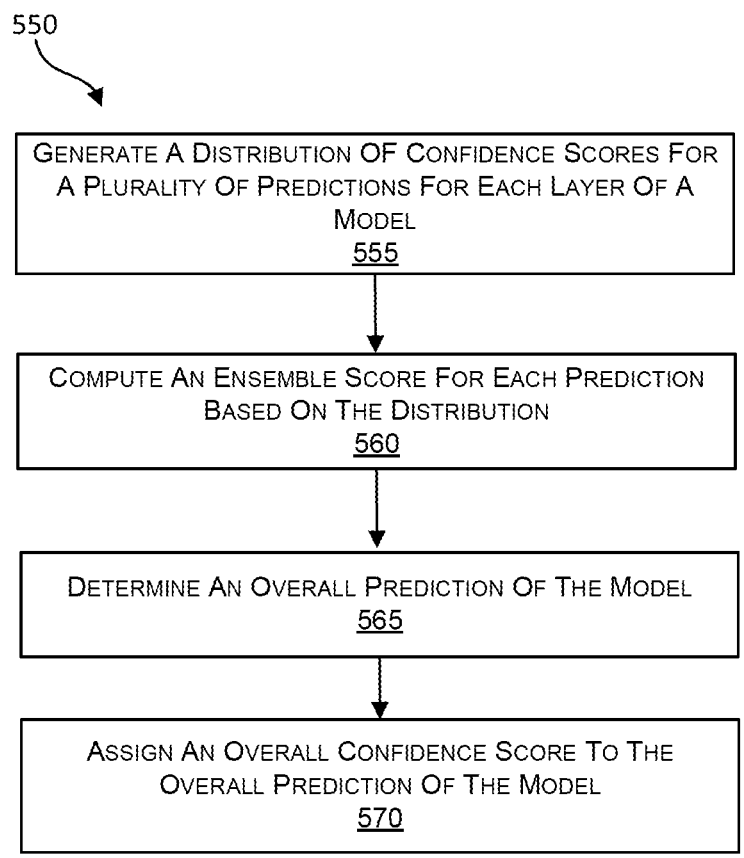
FIG. 5B depicts a flowchart illustrating a process performed by the neural network model in accordance with various embodiments.

FIG. 5B depicts a flowchart 550 illustrating another process performed by the deep neural network (DNN) model in accordance with various embodiments. Specifically, FIG. 5B depicts a flowchart illustrating the ensemble technique for determining an overall prediction and an overall confidence score of the DNN. The processing depicted in FIG. 5B may be implemented in software (e.g., code, instructions, program) executed by one or more processing units (e.g., processors, cores) of the respective systems, hardware, or combinations thereof. The software may be stored on a non-transitory storage medium (e.g., on a memory device). The method presented in FIG. 5B and described below is intended to be illustrative and non-limiting. Although FIG. 5B depicts the various processing steps occurring in a particular sequence or order, this is not intended to be limiting. In certain alternative embodiments, the steps may be performed in some different order or some steps may also be performed in parallel. In certain embodiments, the processing depicted in FIG. 5B may be performed by the confidence score processing unit 250 discussed with respect to FIGS. 2 and 4.

The process commences in step 555, where a distribution of confidence scores is generated for each layer of the DNN model with respect to an input utterance. For instance, a prediction module associated with each layer of the DNN model generates the distribution of confidence scores associated with the layer. The process in step 560 computes an ensemble score for each prediction based on the generated distribution of confidence scores. For instance, the confidence score processing unit computes an ensemble score for each prediction (i.e., intent) as an average (or mean) of confidence scores corresponding to the prediction associated with the different layers of the DNN. For example, referring to FIG. 4, intent 1 has a confidence score of 20% in the first layer, a confidence score of 40% in the second layer, a confidence score of 70% in the third layer, and a confidence score of 90% in the fourth layer. Thus, the ensemble score corresponding to intent 1 is: (0.2+0.4+0.7+0.9)/4=55%, i.e., an average of the respective confidence scores of intent 1 in the different layers.

The process then moves to step 565, where an overall prediction of the model is determined to be the prediction of the last layer of model that has the highest confidence score. For example, referring to FIG. 4, it is seen that the last layer (layer 4) has a 90% confidence score associated with intent 1, a 5% confidence score associated with intent 2, and a 5% confidence score associated with intent 3. Accordingly, intent 1 is determined to correspond to the overall prediction of the model. In step 570, the process assigns an overall confidence score to the overall prediction based on the computed ensemble scores. For instance, the DNN model assigns the ensemble score corresponding to the overall prediction, as the overall confidence score of the model. For example, referring to FIG. 4, the ensemble score of intent 1 (i.e., the intent determined to be the overall intent of the model) is 55%. Thus, the score of 55% (as opposed to the score of 90% associated with intent 1 in the fourth layer) is assigned as the overall confidence score to be associated with the overall prediction of the model.

According to some embodiments, performance of the above described techniques (i.e., the iterative and ensemble technique) for determining an overall prediction and an overall confidence score of the DNN was evaluated over 200 datasets. The evaluations were performed under two different scenarios: a) a DNN model that is hyperparameter tuned, and b) a DNN model without hyperparameter tuning. It is appreciated that hyperparameter tuning is a process of choosing a set of optimal hyperparameters for the DNN model, where a hyperparameter is a parameter whose value is used to control the learning process of the DNN model.

The performance results for the two cases are depicted in Table 1 below. It is observed that a DNN model incurs an increased average performance (over the 200 data sets) in assigning the appropriate confidence score i.e., the overall confidence score of the model, as compared to the standard technique of simply assigning the confidence score of the last layer of the model to be the overall confidence score.

TABLE 1

Average performance improvement of the DNN model evaluated over 200 datasets.

|  | n = 1 | n = 2 | n = 3 |
| --- | --- | --- | --- |
| Without Hyperparameter Tuning | 3% | 2% | 1% |
| With Hyper-parameter Tuning | 11% | 10% | 8% |

It is appreciated that although in the above described embodiments, a prediction module was associated with each layer of the DNN, a prediction module may also be associated with the MUSE layer i.e., the encoder layer. Further, although the embodiments of the present disclosure are described in the context of a DNN model utilized in a chatbot setting, it is appreciated that the techniques of addressing the problem of overconfidence as described herein can be applied in a similar manner to any neural network in a different setting.

Illustrative Systems

Figure 6:
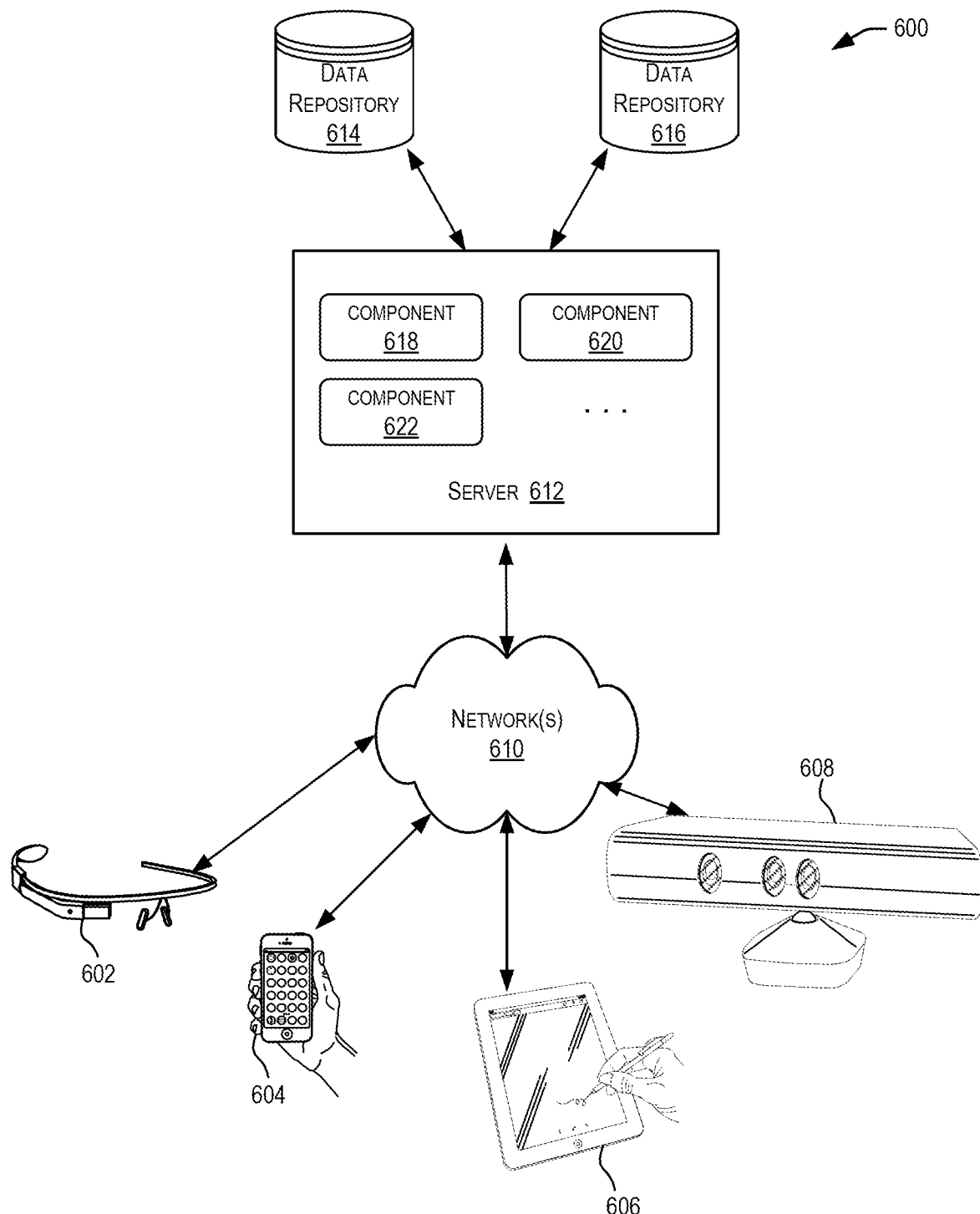
FIG. 6 depicts a simplified diagram of a distributed system for implementing various embodiments.

FIG. 6 depicts a simplified diagram of a distributed system 600. In the illustrated example, distributed system 600 includes one or more client computing devices 602, 604, 606, and 608, coupled to a server 612 via one or more communication networks 610. Clients computing devices 602, 604, 606, and 608 may be configured to execute one or more applications.

In various examples, server 612 may be adapted to run one or more services or software applications that enable one or more embodiments described in this disclosure. In certain examples, server 612 may also provide other services or software applications that may include non-virtual and virtual environments. In some examples, these services may be offered as web-based or cloud services, such as under a Software as a Service (SaaS) model to the users of client computing devices 602, 604, 606, and/or 608. Users operating client computing devices 602, 604, 606, and/or 608 may in turn utilize one or more client applications to interact with server 612 to utilize the services provided by these components.

In the configuration depicted in FIG. 6, server 612 may include one or more components 618, 620 and 622 that implement the functions performed by server 612. These components may include software components that may be executed by one or more processors, hardware components, or combinations thereof. It should be appreciated that various different system configurations are possible, which may be different from distributed system 600. The example shown in FIG. 6 is thus one example of a distributed system for implementing an example system and is not intended to be limiting.

Users may use client computing devices 602, 604, 606, and/or 608 to execute one or more applications, models or chatbots, which may generate one or more events or models that may then be implemented or serviced in accordance with the teachings of this disclosure. A client device may provide an interface that enables a user of the client device to interact with the client device. The client device may also output information to the user via this interface. Although FIG. 6 depicts only four client computing devices, any number of client computing devices may be supported.

The client devices may include various types of computing systems such as portable handheld devices, general purpose computers such as personal computers and laptops, workstation computers, wearable devices, gaming systems, thin clients, various messaging devices, sensors or other sensing devices, and the like. These computing devices may run various types and versions of software applications and operating systems (e.g., Microsoft Windows®, Apple Macintosh®, UNIX® or UNIX-like operating systems, Linux or Linux-like operating systems such as Google Chrome™ OS) including various mobile operating systems (e.g., Microsoft Windows Mobile®, iOS®, Windows Phone®, Android™, BlackBerry®, Palm OS®). Portable handheld devices may include cellular phones, smartphones, (e.g., an iPhone®), tablets (e.g., iPad®), personal digital assistants (PDAs), and the like. Wearable devices may include Google Glass® head mounted display, and other devices. Gaming systems may include various handheld gaming devices, Internet-enabled gaming devices (e.g., a Microsoft Xbox® gaming console with or without a Kinect® gesture input device, Sony PlayStation® system, various gaming systems provided by Nintendo®, and others), and the like. The client devices may be capable of executing various different applications such as various Internet-related apps, communication applications (e.g., E-mail applications, short message service (SMS) applications) and may use various communication protocols.

Network(s) 610 may be any type of network familiar to those skilled in the art that may support data communications using any of a variety of available protocols, including without limitation TCP/IP (transmission control protocol/Internet protocol), SNA (systems network architecture), IPX (Internet packet exchange), AppleTalk®, and the like. Merely by way of example, network(s) 610 may be a local area network (LAN), networks based on Ethernet, Token-Ring, a wide-area network (WAN), the Internet, a virtual network, a virtual private network (VPN), an intranet, an extranet, a public switched telephone network (PSTN), an infra-red network, a wireless network (e.g., a network operating under any of the Institute of Electrical and Electronics (IEEE) 1002.11 suite of protocols, Bluetooth®, and/or any other wireless protocol), and/or any combination of these and/or other networks.

Server 612 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. Server 612 may include one or more virtual machines running virtual operating systems, or other computing architectures involving virtualization such as one or more flexible pools of logical storage devices that may be virtualized to maintain virtual storage devices for the server. In various examples, server 612 may be adapted to run one or more services or software applications that provide the functionality described in the foregoing disclosure.

The computing systems in server 612 may run one or more operating systems including any of those discussed above, as well as any commercially available server operating system. Server 612 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle®, Microsoft®, Sybase®, IBM® (International Business Machines), and the like.

In some implementations, server 612 may include one or more applications to analyze and consolidate data feeds and/or event updates received from users of client computing devices 602, 604, 606, and 608. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 612 may also include one or more applications to display the data feeds and/or real-time events via one or more display devices of client computing devices 602, 604, 606, and 608.

Distributed system 600 may also include one or more data repositories 614, 616. These data repositories may be used to store data and other information in certain examples. For example, one or more of the data repositories 614, 616 may be used to store information such as information related to chatbot performance or generated models for use by chatbots used by server 612 when performing various functions in accordance with various embodiments. Data repositories 614, 616 may reside in a variety of locations. For example, a data repository used by server 612 may be local to server 612 or may be remote from server 612 and in communication with server 612 via a network-based or dedicated connection. Data repositories 614, 616 may be of different types. In certain examples, a data repository used by server 612 may be a database, for example, a relational database, such as databases provided by Oracle Corporation® and other vendors. One or more of these databases may be adapted to enable storage, update, and retrieval of data to and from the database in response to SQL-formatted commands.

In certain examples, one or more of data repositories 614, 616 may also be used by applications to store application data. The data repositories used by applications may be of different types such as, for example, a key-value store repository, an object store repository, or a general storage repository supported by a file system.

Figure 7:
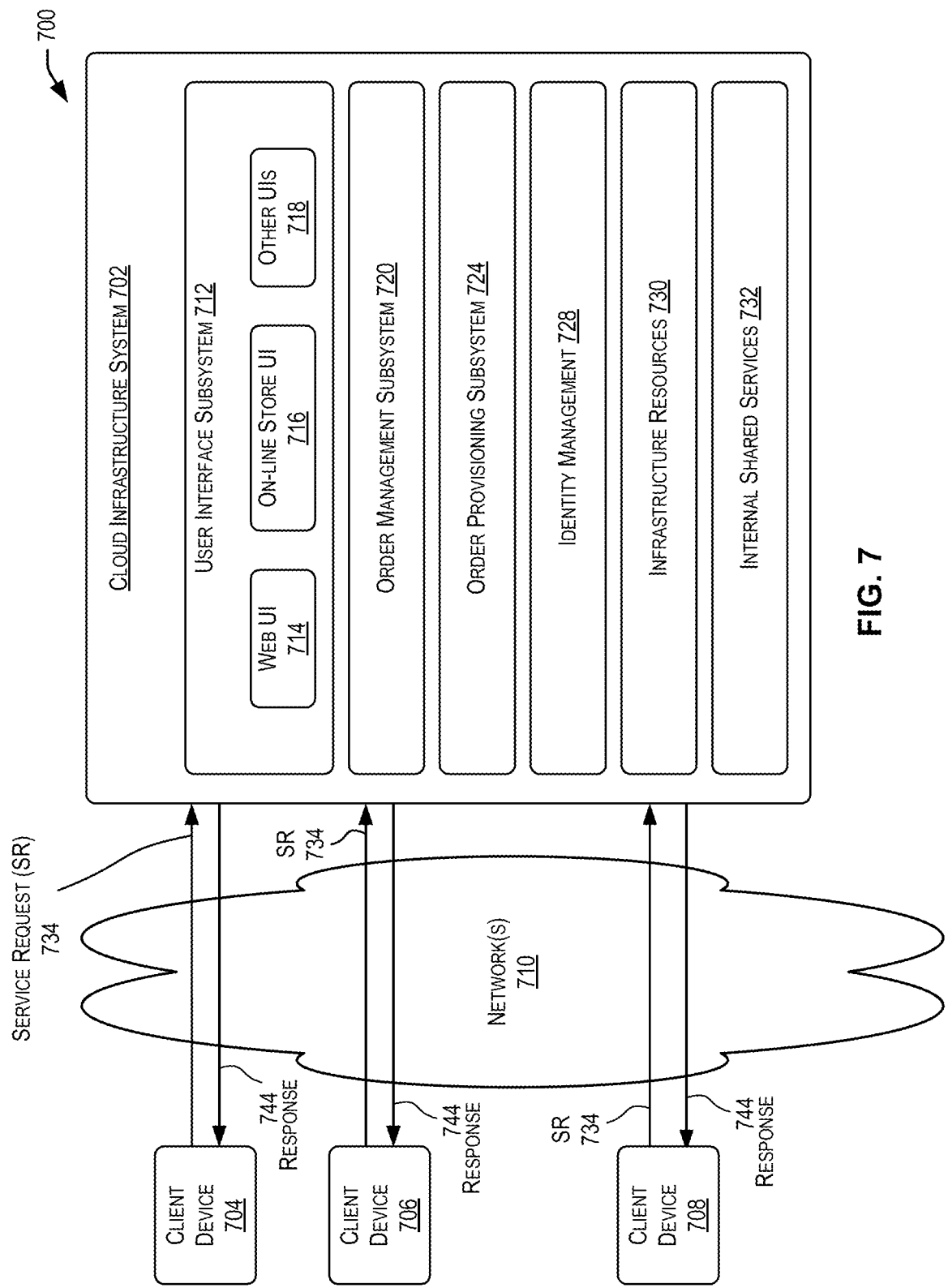
FIG. 7 is a simplified block diagram of one or more components of a system environment by which services provided by one or more components of an embodiment system may be offered as cloud services, in accordance with various embodiments.

In certain examples, the functionalities described in this disclosure may be offered as services via a cloud environment. FIG. 7 is a simplified block diagram 700 of a cloud based system environment in which various services may be offered as cloud services in accordance with certain examples. In the example depicted in FIG. 7, cloud infrastructure system 702 may provide one or more cloud services that may be requested by users using one or more client computing devices 704, 706, and 708. Cloud infrastructure system 702 may comprise one or more computers and/or servers that may include those described above for server 612. The computers in cloud infrastructure system 702 may be organized as general purpose computers, specialized server computers, server farms, server clusters, or any other appropriate arrangement and/or combination.

Network(s) 710 may facilitate communication and exchange of data between clients 704, 706, and 708 and cloud infrastructure system 702. Network(s) 710 may include one or more networks. The networks may be of the same or different types. Network(s) 710 may support one or more communication protocols, including wired and/or wireless protocols, for facilitating the communications.

The example depicted in FIG. 7 is only one example of a cloud infrastructure system and is not intended to be limiting. It should be appreciated that, in some other examples, cloud infrastructure system 702 may have more or fewer components than those depicted in FIG. 7, may combine two or more components, or may have a different configuration or arrangement of components. For example, although FIG. 7 depicts three client computing devices, any number of client computing devices may be supported in alternative examples.

The term cloud service is generally used to refer to a service that is made available to users on demand and via a communication network such as the Internet by systems (e.g., cloud infrastructure system 702) of a service provider. Typically, in a public cloud environment, servers and systems that make up the cloud service provider's system are different from the customer's own on-premise servers and systems. The cloud service provider's systems are managed by the cloud service provider. Customers may thus avail themselves of cloud services provided by a cloud service provider without having to purchase separate licenses, support, or hardware and software resources for the services. For example, a cloud service provider's system may host an application, and a user may, via the Internet, on demand, order and use the application without the user having to buy infrastructure resources for executing the application. Cloud services are designed to provide easy, scalable access to applications, resources and services. Several providers offer cloud services. For example, several cloud services are offered by Oracle Corporation® of Redwood Shores, California, such as middleware services, database services, Java cloud services, and others.

In certain examples, cloud infrastructure system 702 may provide one or more cloud services using different models such as under a Software as a Service (SaaS) model, a Platform as a Service (PaaS) model, an Infrastructure as a Service (IaaS) model, and others, including hybrid service models. Cloud infrastructure system 702 may include a suite of applications, middleware, databases, and other resources that enable provision of the various cloud services.

A SaaS model enables an application or software to be delivered to a customer over a communication network like the Internet, as a service, without the customer having to buy the hardware or software for the underlying application. For example, a SaaS model may be used to provide customers access to on-demand applications that are hosted by cloud infrastructure system 702. Examples of SaaS services provided by Oracle Corporation® include, without limitation, various services for human resources/capital management, customer relationship management (CRM), enterprise resource planning (ERP), supply chain management (SCM), enterprise performance management (EPM), analytics services, social applications, and others.

An IaaS model is generally used to provide infrastructure resources (e.g., servers, storage, hardware and networking resources) to a customer as a cloud service to provide elastic compute and storage capabilities. Various IaaS services are provided by Oracle Corporation®.

A PaaS model is generally used to provide, as a service, platform and environment resources that enable customers to develop, run, and manage applications and services without the customer having to procure, build, or maintain such resources. Examples of PaaS services provided by Oracle Corporation® include, without limitation, Oracle Java Cloud Service (JCS), Oracle Database Cloud Service (DBCS), data management cloud service, various application development solutions services, and others.

Cloud services are generally provided on an on-demand self-service basis, subscription-based, elastically scalable, reliable, highly available, and secure manner. For example, a customer, via a subscription order, may order one or more services provided by cloud infrastructure system 702. Cloud infrastructure system 702 then performs processing to provide the services requested in the customer's subscription order. For example, a user may use utterances to request the cloud infrastructure system to take a certain action (e.g., an intent), as described above, and/or provide services for a chatbot system as described herein. Cloud infrastructure system 702 may be configured to provide one or even multiple cloud services.

Cloud infrastructure system 702 may provide the cloud services via different deployment models. In a public cloud model, cloud infrastructure system 702 may be owned by a third party cloud services provider and the cloud services are offered to any general public customer, where the customer may be an individual or an enterprise. In certain other examples, under a private cloud model, cloud infrastructure system 702 may be operated within an organization (e.g., within an enterprise organization) and services provided to customers that are within the organization. For example, the customers may be various departments of an enterprise such as the Human Resources department, the Payroll department, etc. or even individuals within the enterprise. In certain other examples, under a community cloud model, the cloud infrastructure system 702 and the services provided may be shared by several organizations in a related community. Various other models such as hybrids of the above mentioned models may also be used.

Client computing devices 704, 706, and 708 may be of different types (such as client computing devices 602, 604, 606, and 608 depicted in FIG. 6) and may be capable of operating one or more client applications. A user may use a client device to interact with cloud infrastructure system 702, such as to request a service provided by cloud infrastructure system 702. For example, a user may use a client device to request information or action from a chatbot as described in this disclosure.

In some examples, the processing performed by cloud infrastructure system 702 for providing services may involve model training and deployment. This analysis may involve using, analyzing, and manipulating data sets to train and deploy one or more models. This analysis may be performed by one or more processors, possibly processing the data in parallel, performing simulations using the data, and the like. For example, big data analysis may be performed by cloud infrastructure system 702 for generating and training one or more models for a chatbot system. The data used for this analysis may include structured data (e.g., data stored in a database or structured according to a structured model) and/or unstructured data (e.g., data blobs (binary large objects)).

As depicted in the example in FIG. 7, cloud infrastructure system 702 may include infrastructure resources 730 that are utilized for facilitating the provision of various cloud services offered by cloud infrastructure system 702. Infrastructure resources 730 may include, for example, processing resources, storage or memory resources, networking resources, and the like. In certain examples, the storage virtual machines that are available for servicing storage requested from applications may be part of cloud infrastructure system 702. In other examples, the storage virtual machines may be part of different systems.

In certain examples, to facilitate efficient provisioning of these resources for supporting the various cloud services provided by cloud infrastructure system 702 for different customers, the resources may be bundled into sets of resources or resource modules (also referred to as "pods"). Each resource module or pod may comprise a pre-integrated and optimized combination of resources of one or more types. In certain examples, different pods may be pre-provisioned for different types of cloud services. For example, a first set of pods may be provisioned for a database service, a second set of pods, which may include a different combination of resources than a pod in the first set of pods, may be provisioned for Java service, and the like. For some services, the resources allocated for provisioning the services may be shared between the services.

Cloud infrastructure system 702 may itself internally use services 732 that are shared by different components of cloud infrastructure system 702 and which facilitate the provisioning of services by cloud infrastructure system 702. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

Cloud infrastructure system 702 may comprise multiple subsystems. These subsystems may be implemented in software, or hardware, or combinations thereof. As depicted in FIG. 7, the subsystems may include a user interface subsystem 712 that enables users or customers of cloud infrastructure system 702 to interact with cloud infrastructure system 702. User interface subsystem 712 may include various different interfaces such as a web interface 714, an online store interface 716 where cloud services provided by cloud infrastructure system 702 are advertised and are purchasable by a consumer, and other interfaces 718. For example, a customer may, using a client device, request (service request 734) one or more services provided by cloud infrastructure system 702 using one or more of interfaces 714, 716, and 718. For example, a customer may access the online store, browse cloud services offered by cloud infrastructure system 702, and place a subscription order for one or more services offered by cloud infrastructure system 702 that the customer wishes to subscribe to. The service request may include information identifying the customer and one or more services that the customer desires to subscribe to. For example, a customer may place a subscription order for a service offered by cloud infrastructure system 702. As part of the order, the customer may provide information identifying a chatbot system for which the service is to be provided and optionally one or more credentials for the chatbot system.

In certain examples, such as the example depicted in FIG. 7, cloud infrastructure system 702 may comprise an order management subsystem (OMS) 720 that is configured to process the new order. As part of this processing, OMS 720 may be configured to: create an account for the customer, if not done already; receive billing and/or accounting information from the customer that is to be used for billing the customer for providing the requested service to the customer; verify the customer information; upon verification, book the order for the customer; and orchestrate various workflows to prepare the order for provisioning.

Once properly validated, OMS 720 may then invoke the order provisioning subsystem (OPS) 724 that is configured to provision resources for the order including processing, memory, and networking resources. The provisioning may include allocating resources for the order and configuring the resources to facilitate the service requested by the customer order. The manner in which resources are provisioned for an order and the type of the provisioned resources may depend upon the type of cloud service that has been ordered by the customer. For example, according to one workflow, OPS 724 may be configured to determine the particular cloud service being requested and identify a number of pods that may have been pre-configured for that particular cloud service. The number of pods that are allocated for an order may depend upon the size/amount/level/scope of the requested service. For example, the number of pods to be allocated may be determined based upon the number of users to be supported by the service, the duration of time for which the service is being requested, and the like. The allocated pods may then be customized for the particular requesting customer for providing the requested service.

In certain examples, setup phase processing, as described above, may be performed by cloud infrastructure system 702 as part of the provisioning process. Cloud infrastructure system 702 may generate an application ID and select a storage virtual machine for an application from among storage virtual machines provided by cloud infrastructure system 702 itself or from storage virtual machines provided by other systems other than cloud infrastructure system 702.

Cloud infrastructure system 702 may send a response or notification 744 to the requesting customer to indicate when the requested service is now ready for use. In some instances, information (e.g., a link) may be sent to the customer that enables the customer to start using and availing the benefits of the requested services. In certain examples, for a customer requesting the service, the response may include a chatbot system ID generated by cloud infrastructure system 702 and information identifying a chatbot system selected by cloud infrastructure system 702 for the chatbot system corresponding to the chatbot system ID.

Cloud infrastructure system 702 may provide services to multiple customers. For each customer, cloud infrastructure system 702 is responsible for managing information related to one or more subscription orders received from the customer, maintaining customer data related to the orders, and providing the requested services to the customer. Cloud infrastructure system 702 may also collect usage statistics regarding a customer's use of subscribed services. For example, statistics may be collected for the amount of storage used, the amount of data transferred, the number of users, and the amount of system up time and system down time, and the like. This usage information may be used to bill the customer. Billing may be done, for example, on a monthly cycle.

Cloud infrastructure system 702 may provide services to multiple customers in parallel. Cloud infrastructure system 702 may store information for these customers, including possibly proprietary information. In certain examples, cloud infrastructure system 702 comprises an identity management subsystem (IMS) 728 that is configured to manage customer information and provide the separation of the managed information such that information related to one customer is not accessible by another customer. IMS 728 may be configured to provide various security-related services such as identity services, such as information access management, authentication and authorization services, services for managing customer identities and roles and related capabilities, and the like.

Figure 8:
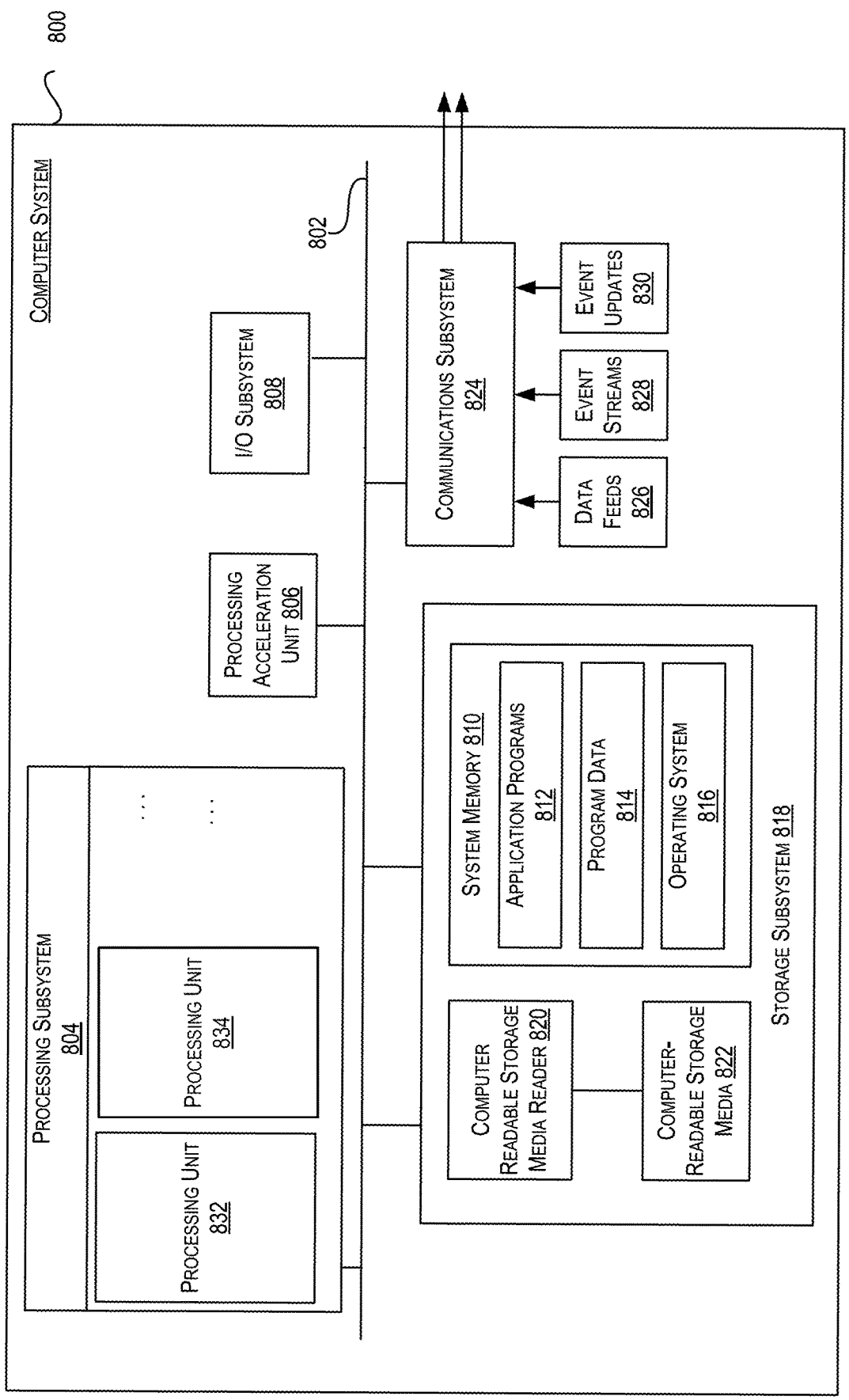
FIG. 8 illustrates an example computer system that may be used to implement various embodiments.

FIG. 8 illustrates an example of computer system 800. In some examples, computer system 800 may be used to implement any of the digital assistant or chatbot systems within a distributed environment, and various servers and computer systems described above. As shown in FIG. 8, computer system 800 includes various subsystems including a processing subsystem 804 that communicates with a number of other subsystems via a bus subsystem 802. These other subsystems may include a processing acceleration unit 806, an I/O subsystem 808, a storage subsystem 818, and a communications subsystem 824. Storage subsystem 818 may include non-transitory computer-readable storage media including storage media 822 and a system memory 810.

Bus subsystem 802 provides a mechanism for letting the various components and subsystems of computer system 800 communicate with each other as intended. Although bus subsystem 802 is shown schematically as a single bus, alternative examples of the bus subsystem may utilize multiple buses. Bus subsystem 802 may be any of several types of bus structures including a memory bus or memory controller, a peripheral bus, a local bus using any of a variety of bus architectures, and the like. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which may be implemented as a Mezzanine bus manufactured to the IEEE P1386.1 standard, and the like.

Processing subsystem 804 controls the operation of computer system 800 and may comprise one or more processors, application specific integrated circuits (ASICs), or field programmable gate arrays (FPGAs). The processors may include be single core or multicore processors. The processing resources of computer system 800 may be organized into one or more processing units 832, 834, etc. A processing unit may include one or more processors, one or more cores from the same or different processors, a combination of cores and processors, or other combinations of cores and processors. In some examples, processing subsystem 804 may include one or more special purpose co-processors such as graphics processors, digital signal processors (DSPs), or the like. In some examples, some or all of the processing units of processing subsystem 804 may be implemented using customized circuits, such as application specific integrated circuits (ASICs), or field programmable gate arrays (FPGAs).

In some examples, the processing units in processing subsystem 804 may execute instructions stored in system memory 810 or on computer readable storage media 822. In various examples, the processing units may execute a variety of programs or code instructions and may maintain multiple concurrently executing programs or processes. At any given time, some or all of the program code to be executed may be resident in system memory 810 and/or on computer-readable storage media 822 including potentially on one or more storage devices. Through suitable programming, processing subsystem 804 may provide various functionalities described above. In instances where computer system 800 is executing one or more virtual machines, one or more processing units may be allocated to each virtual machine.

In certain examples, a processing acceleration unit 806 may optionally be provided for performing customized processing or for off-loading some of the processing performed by processing subsystem 804 so as to accelerate the overall processing performed by computer system 800.

I/O subsystem 808 may include devices and mechanisms for inputting information to computer system 800 and/or for outputting information from or via computer system 800. In general, use of the term input device is intended to include all possible types of devices and mechanisms for inputting information to computer system 800. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as inputs to an input device (e.g., Google Glass®). Additionally, user interface input devices may include voice recognition sensing devices that enable users to interact with voice recognition systems (e.g., Siri® navigator) through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, and medical ultrasonography devices. User interface input devices may also include, for example, audio input devices such as MIDI keyboards, digital musical instruments and the like.

In general, use of the term output device is intended to include all possible types of devices and mechanisms for outputting information from computer system 800 to a user or other computer. User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. For example, user interface output devices may include, without limitation, a variety of display devices that visually convey text, graphics and audio/video information such as monitors, printers, speakers, headphones, automotive navigation systems, plotters, voice output devices, and modems.

Storage subsystem 818 provides a repository or data store for storing information and data that is used by computer system 800. Storage subsystem 818 provides a tangible non-transitory computer-readable storage medium for storing the basic programming and data constructs that provide the functionality of some examples. Storage subsystem 818 may store software (e.g., programs, code modules, instructions) that when executed by processing subsystem 804 provides the functionality described above. The software may be executed by one or more processing units of processing subsystem 804. Storage subsystem 818 may also provide authentication in accordance with the teachings of this disclosure.

Storage subsystem 818 may include one or more non-transitory memory devices, including volatile and non-volatile memory devices. As shown in FIG. 8, storage subsystem 818 includes a system memory 810 and a computer-readable storage media 822. System memory 810 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 800, such as during start-up, may typically be stored in the ROM. The RAM typically contains data and/or program modules that are presently being operated and executed by processing subsystem 804. In some implementations, system memory 810 may include multiple different types of memory, such as static random access memory (SRAM), dynamic random access memory (DRAM), and the like.

By way of example, and not limitation, as depicted in FIG. 8, system memory 810 may load application programs 812 that are being executed, which may include various applications such as Web browsers, mid-tier applications, relational database management systems (RDBMS), etc., program data 814, and an operating system 816. By way of example, operating system 816 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, Palm® OS operating systems, and others.

Computer-readable storage media 822 may store programming and data constructs that provide the functionality of some examples. Computer-readable media 822 may provide storage of computer-readable instructions, data structures, program modules, and other data for computer system 800. Software (programs, code modules, instructions) that, when executed by processing subsystem 804 provides the functionality described above, may be stored in storage subsystem 818. By way of example, computer-readable storage media 822 may include non-volatile memory such as a hard disk drive, a magnetic disk drive, an optical disk drive such as a CD ROM, DVD, a Blu-Ray® disk, or other optical media. Computer-readable storage media 822 may include, but is not limited to, Zip® drives, flash memory cards, universal serial bus (USB) flash drives, secure digital (SD) cards, DVD disks, digital video tape, and the like. Computer-readable storage media 822 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs.

In certain examples, storage subsystem 818 may also include a computer-readable storage media reader 820 that may further be connected to computer-readable storage media 822. Reader 820 may receive and be configured to read data from a memory device such as a disk, a flash drive, etc.

In certain examples, computer system 800 may support virtualization technologies, including but not limited to virtualization of processing and memory resources. For example, computer system 800 may provide support for executing one or more virtual machines. In certain examples, computer system 800 may execute a program such as a hypervisor that facilitated the configuring and managing of the virtual machines. Each virtual machine may be allocated memory, compute (e.g., processors, cores), I/O, and networking resources. Each virtual machine generally runs independently of the other virtual machines. A virtual machine typically runs its own operating system, which may be the same as or different from the operating systems executed by other virtual machines executed by computer system 800. Accordingly, multiple operating systems may potentially be run concurrently by computer system 800.

Communications subsystem 824 provides an interface to other computer systems and networks. Communications subsystem 824 serves as an interface for receiving data from and transmitting data to other systems from computer system 800. For example, communications subsystem 824 may enable computer system 800 to establish a communication channel to one or more client devices via the Internet for receiving and sending information from and to the client devices. For example, when computer system 800 is used to implement bot system 120 depicted in FIG. 1, the communication subsystem may be used to communicate with a chatbot system selected for an application.

Communication subsystem 824 may support both wired and/or wireless communication protocols. In certain examples, communications subsystem 824 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.XX family standards, or other mobile communication technologies, or any combination thereof), global positioning system (GPS) receiver components, and/or other components. In some examples, communications subsystem 824 may provide wired network connectivity (e.g., Ethernet) in addition to or instead of a wireless interface.

Communication subsystem 824 may receive and transmit data in various forms. In some examples, in addition to other forms, communications subsystem 824 may receive input communications in the form of structured and/or unstructured data feeds 826, event streams 828, event updates 830, and the like. For example, communications subsystem 824 may be configured to receive (or send) data feeds 826 in real-time from users of social media networks and/or other communication services such as Twitter® feeds, Facebook® updates, web feeds such as Rich Site Summary (RSS) feeds, and/or real-time updates from one or more third party information sources.

In certain examples, communications subsystem 824 may be configured to receive data in the form of continuous data streams, which may include event streams 828 of real-time events and/or event updates 830, which may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 824 may also be configured to communicate data from computer system 800 to other computer systems or networks. The data may be communicated in various different forms such as structured and/or unstructured data feeds 826, event streams 828, event updates 830, and the like to one or more databases that may be in communication with one or more streaming data source computers coupled to computer system 800.

Computer system 800 may be one of various types, including a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system. Due to the ever-changing nature of computers and networks, the description of computer system 800 depicted in FIG. 8 is intended only as a specific example. Many other configurations having more or fewer components than the system depicted in FIG. 8 are possible. Based on the disclosure and teachings provided herein, it should be appreciate there are other ways and/or methods to implement the various examples.

Although specific examples have been described, various modifications, alterations, alternative constructions, and equivalents are possible. Examples are not restricted to operation within certain specific data processing environments, but are free to operate within a plurality of data processing environments. Additionally, although certain examples have been described using a particular series of transactions and steps, it should be apparent to those skilled in the art that this is not intended to be limiting. Although some flowcharts describe operations as a sequential process, many of the operations may be performed in parallel or concurrently. In addition, the order of the operations may be rearranged. A process may have additional steps not included in the figure. Various features and aspects of the above-described examples may be used individually or jointly.

Further, while certain examples have been described using a particular combination of hardware and software, it should be recognized that other combinations of hardware and software are also possible. Certain examples may be implemented only in hardware, or only in software, or using combinations thereof. The various processes described herein may be implemented on the same processor or different processors in any combination.

Where devices, systems, components or modules are described as being configured to perform certain operations or functions, such configuration may be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes may communicate using a variety of techniques including but not limited to conventional techniques for inter-process communications, and different pairs of processes may use different techniques, or the same pair of processes may use different techniques at different times.

Specific details are given in this disclosure to provide a thorough understanding of the examples. However, examples may be practiced without these specific details. For example, well-known circuits, processes, algorithms, structures, and techniques have been shown without unnecessary detail in order to avoid obscuring the examples. This description provides example examples only, and is not intended to limit the scope, applicability, or configuration of other examples. Rather, the preceding description of the examples will provide those skilled in the art with an enabling description for implementing various examples. Various changes may be made in the function and arrangement of elements.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific examples have been described, these are not intended to be limiting. Various modifications and equivalents are within the scope of the following claims.

In the foregoing specification, aspects of the disclosure are described with reference to specific examples thereof, but those skilled in the art will recognize that the disclosure is not limited thereto. Various features and aspects of the above-described disclosure may be used individually or jointly. Further, examples may be utilized in any number of environments and applications beyond those described herein without departing from the broader spirit and scope of the specification. The specification and drawings are, accordingly, to be regarded as illustrative rather than restrictive.

In the foregoing description, for the purposes of illustration, methods were described in a particular order. It should be appreciated that in alternate examples, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Where components are described as being configured to perform certain operations, such configuration may be accomplished, for example, by designing electronic circuits or other hardware to perform the operation, by programming programmable electronic circuits (e.g., microprocessors, or other suitable electronic circuits) to perform the operation, or any combination thereof.

While illustrative examples of the application have been described in detail herein, it is to be understood that the inventive concepts may be otherwise variously embodied and employed, and that the appended claims are intended to be construed to include such variations, except as limited by the prior art.

What is claimed:

1. A method comprising:
   generating, for each layer of a plurality of layers of a deep neural network (DNN) machine learning model, a distribution of confidence scores for a plurality of predictions with respect to an input utterance, wherein the plurality of layers of the DNN machine learning model comprises N layers, and a subset of the plurality of layers corresponds to a first N−1 layers of the DNN machine learning model;
   determining a prediction to be assigned to each layer of the DNN machine learning model based on the distribution of confidence scores generated for the layer;
   generating, based on the determining, an overall prediction of the DNN machine learning model;
   iteratively processing a subset of the plurality of layers of the DNN machine learning model to identify a layer of the DNN machine learning model whose assigned prediction satisfies a criterion, wherein iteratively processing the subset of the plurality of layers of the DNN machine learning model further comprises:
      iterating over layers i=I to N−1 and comparing the assigned prediction of layer i to the overall prediction, and
      when a match between the assigned prediction of layer i and the overall prediction is found, discontinuing the iterative processing and assigning the confidence score associated with the assigned prediction of the $i^{th}$ layer having a prediction that matches the overall prediction, as the overall confidence score associated with the overall prediction of the DNN machine learning model; and
   assigning a confidence score associated with the assigned prediction of the layer of the DNN machine learning model as an overall confidence score to be associated with the overall prediction of the DNN machine learning model.

2. The method of claim 1, wherein determining a prediction to be assigned to each layer of the DNN machine learning model further comprises:
   assigning one of the plurality of predictions having a highest confidence score in the distribution of confidence scores generated for the layer as the prediction for the layer.

3. The method of claim 1, wherein generating the overall prediction of the DNN machine learning model further comprises:
   assigning a prediction of a last layer of the DNN machine learning model having a highest confidence score in the distribution of confidence scores associated with the last layer as the overall prediction of the DNN machine learning model, the last layer being an output layer of the DNN machine learning model.

4. The method of claim 1, wherein the criterion corresponds to the assigned prediction of the layer being the same as the overall prediction of the DNN machine learning model.

5. The method of claim 1, wherein DNN machine learning model comprises an encoder configured to receive the input utterance and generate an embedding, and each layer of the plurality of layers of the DNN machine learning model comprises a prediction module configured to generate the distribution of confidence scores associated with the layer.

6. The method of claim 1, wherein the DNN machine learning model is used in a chatbot system as a classifier and is configured to, for a given input, predict or infer a class or category for the input from a set of target classes or categories.

7. The method of claim 5, wherein:
a first prediction module associated with a first layer of the machine learning model generates a first distribution of confidence scores associated with the first layer based on the embedding generated by the encoder; and
a second layer of the machine learning model generates a second distribution of confidence scores associated with the second layer based on the embedding processed by the first layer.

8. A computing device comprising:
a processor; and
a memory including instructions that, when executed with the processor, cause the computing device to, at least:
generate, for each layer of a plurality of layers of a deep neural network (DNN) machine learning model, a distribution of confidence scores for a plurality of predictions with respect to an input utterance, wherein the plurality of layers of the DNN machine learning model comprises N layers, and a subset of the plurality of layers corresponds to a first N−1 layers of the DNN machine learning model;
determine a prediction to be assigned to each layer of the DNN machine learning model based on the distribution of confidence scores generated for the layer;
generate an overall prediction of the DNN machine learning model; iteratively process a subset of the plurality of layers of the DNN machine learning model to identify a layer of the DNN machine learning model whose assigned prediction satisfies a criterion, wherein iteratively processing the subset of the plurality of layers of the DNN machine learning model further comprises:
iterating over layers i=I to N−1 and comparing the assigned prediction of layer i to the overall prediction, and
when a match between the assigned prediction of layer i and the overall prediction is found, discontinuing the iterative processing and assigning the confidence score associated with the assigned prediction of the $i^{th}$ layer having a prediction that matches the overall prediction, as the overall confidence score associated with the overall prediction of the DNN machine learning model; and
assign a confidence score associated with the assigned prediction of the layer of the DNN machine learning model as an overall confidence score to be associated with the overall prediction of the DNN machine learning model.

9. The computing device of claim 8, wherein the processor is further configured to assign one of the plurality of predictions having a highest confidence score in the distribution of confidence scores generated for each layer, as a prediction for the layer.

10. The computing device of claim 8, wherein the processor is further configured to generate the overall prediction of the DNN machine learning model by assigning a prediction of a last layer of the DNN machine learning model having a highest confidence score in the distribution of confidence scores associated with the last layer to correspond to the overall prediction, the last layer being an output layer of the DNN machine learning model.

11. The computing device of claim 8, wherein the criterion corresponds to the assigned prediction of the layer being the same as the overall prediction of the DNN machine learning model.

12. The computing device of claim 8, wherein the DNN machine learning model comprises an encoder configured to receive the input utterance and generate an embedding, and each layer of the plurality of layers of the DNN machine learning model comprises a prediction module configured to generate the distribution of confidence scores associated with the layer.

13. The computing device of claim 8, wherein the DNN machine learning model is a classifier in a chatbot system and is configured to, for a given input, predict or infer a class or category for the input from a set of target classes or categories.

14. The computing device of claim 12, wherein:
a first prediction module associated with a first layer of the machine learning model generates a first distribution of confidence scores associated with the first layer based on the embedding generated by the encoder, and a second layer of the machine learning model generates a second distribution of confidence scores associated with the second layer based on the embedding processed by the first layer.

15. A method comprising:
generating, for each layer of a plurality of layers of a deep neural network (DNN) machine learning model, a distribution of confidence scores for a plurality of predictions with respect to an input utterance;
computing, for each prediction of the plurality of predictions, a score based on the distribution of confidence scores for the plurality of layers of the DNN machine learning model, wherein the score for each prediction is an ensemble score comprising an average or a mean of the confidence scores for the plurality of layers of the DNN machine learning model;
determining one of the plurality of predictions to correspond to an overall prediction of the DNN machine learning model; and
assigning the score associated with the one of the plurality of predictions as an overall confidence score to be associated with the overall prediction of the DNN machine learning model,
wherein the DNN machine learning model comprises an encoder configured to receive the input utterance and generate an embedding and each layer of plurality of layers of the DNN machine learning model comprises a prediction module configured to generate the distribution of confidence scores associated with the layer, and
wherein a first prediction module associated with a first layer of the DNN machine learning model generates a first distribution of confidence scores associated with the first layer based on the embedding generated by the encoder, and a second layer of the DNN machine learning model generates a second distribution of confidence scores associated with the second layer based on the embedding processed by the first layer.

16. The method of claim 15, wherein one of the plurality of predictions corresponding to the overall prediction is a prediction of a last layer of the DNN machine learning model having a highest confidence score in the distribution of confidence scores associated with the last layer, the last layer being an output layer of the DNN machine learning model.

17. The method of claim 16, wherein the score for the prediction is an average of confidence scores of the prediction with respect to the plurality of layers of the DNN machine learning model.

18. The method of claim 15, wherein the DNN machine learning model is used in a chatbot system as a classifier and is configured to, for a given input, predict or infer a class or category for the input from a set of target classes or categories.

19. The method of claim 16, wherein the last layer of the DNN machine learning model uses a softmax function to produce the distribution of confidence scores associated with the last layer.

* * * * *